(12) United States Patent
Byun et al.

(10) Patent No.: US 10,074,901 B2
(45) Date of Patent: Sep. 11, 2018

(54) BEAM STEERING OPTICAL PHASED ARRAYS

(71) Applicant: Samsung Electronics Co., Ltd., Suwon-si, Gyeonggi-do (KR)

(72) Inventors: Hyun-il Byun, Seongnam-si (KR); Dong-jae Shin, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/609,291

(22) Filed: May 31, 2017

(65) Prior Publication Data

US 2018/0175501 A1 Jun. 21, 2018

(30) Foreign Application Priority Data

Dec. 16, 2016 (KR) ........................ 10-2016-0172898

(51) Int. Cl.
  *G02B 6/28* (2006.01)
  *H01Q 3/26* (2006.01)
  *G02F 1/29* (2006.01)

(52) U.S. Cl.
  CPC ......... *H01Q 3/2676* (2013.01); *G02B 6/2813* (2013.01); *G02F 1/292* (2013.01)

(58) Field of Classification Search
  None
  See application file for complete search history.

(56) References Cited

U.S. PATENT DOCUMENTS 6,289,147 B1  9/2001 Bulthuis et al.
6,377,213 B1 * 4/2002 Odachi ............... G01S 3/48
                                              342/372

(Continued)

FOREIGN PATENT DOCUMENTS

JP      3010442 B1    2/2000
JP   2003/066387 A    3/2003

(Continued)

OTHER PUBLICATIONS

"Two-dimensional free-space beam steering with an optical phased array on silicon-on-insulator", J.K. Doylend et al., Oct. 24, 2011, vol. 19, No. 22 Optics Express 21592.

(Continued)

*Primary Examiner* — Tina Wong
(74) *Attorney, Agent, or Firm* — Harness, Dickey & Pierce, PLC

(57) ABSTRACT

A beam steering optical phased array (OPA) may include an optical signal distributor including a plurality of output terminals configured to divide and output input optical signals and phase shifters arranged at the plurality of output terminals and configured to receive the divided optical signals and shift phases thereof to generate phase-shifted optical signals. The beam steering OPA may include antennas configured to receive the phase-shifted optical signals and an optical signal interferometer. The optical signal interferometer may include first input waveguide regions connected to a limited selection of the antennas and extending in a first direction, a multi-mode waveguide region connected to the first input waveguide regions, and a first output waveguide region connected to the multi-mode waveguide region and extending in the first direction. The beam OPA may enable errors due to process dispersion to be effectively corrected, and thus, the beam steering OPA may have enhanced reliability.

20 Claims, 20 Drawing Sheets

(56) References Cited

U.S. PATENT DOCUMENTS

| | | | |
|---|---|---|---|
| 7,457,547 | B2 | 11/2008 | Frisken et al. |
| 7,671,799 | B1 * | 3/2010 | Paek |
| 9,124,373 | B2 * | 9/2015 | Aflatouni ............ H04B 10/2504 |
| 2006/0098156 | A1 | 5/2006 | Frisken et al. |
| 2009/0237640 | A1 | 9/2009 | Krikorian et al. |
| 2015/0115978 | A1 | 4/2015 | Bories et al. |
| 2015/0190104 | A1 | 7/2015 | Exelmans |
| 2016/0161600 | A1 | 6/2016 | Eldada et al. |
| 2016/0191170 | A1 | 6/2016 | Aflatouni et al. |

FOREIGN PATENT DOCUMENTS

| | | | |
|---|---|---|---|
| JP | 2007/251255 | A | 9/2007 |
| JP | 5188402 | B2 | 4/2013 |
| JP | 5478377 | B2 | 4/2014 |

OTHER PUBLICATIONS

Electrically pumped hybrid AlGaInAs-silicon evanescent last, Alexander W. Fang et al., Oct. 2, 2016, vol. 14. No. 20, Optics Express 9203.

* cited by examiner

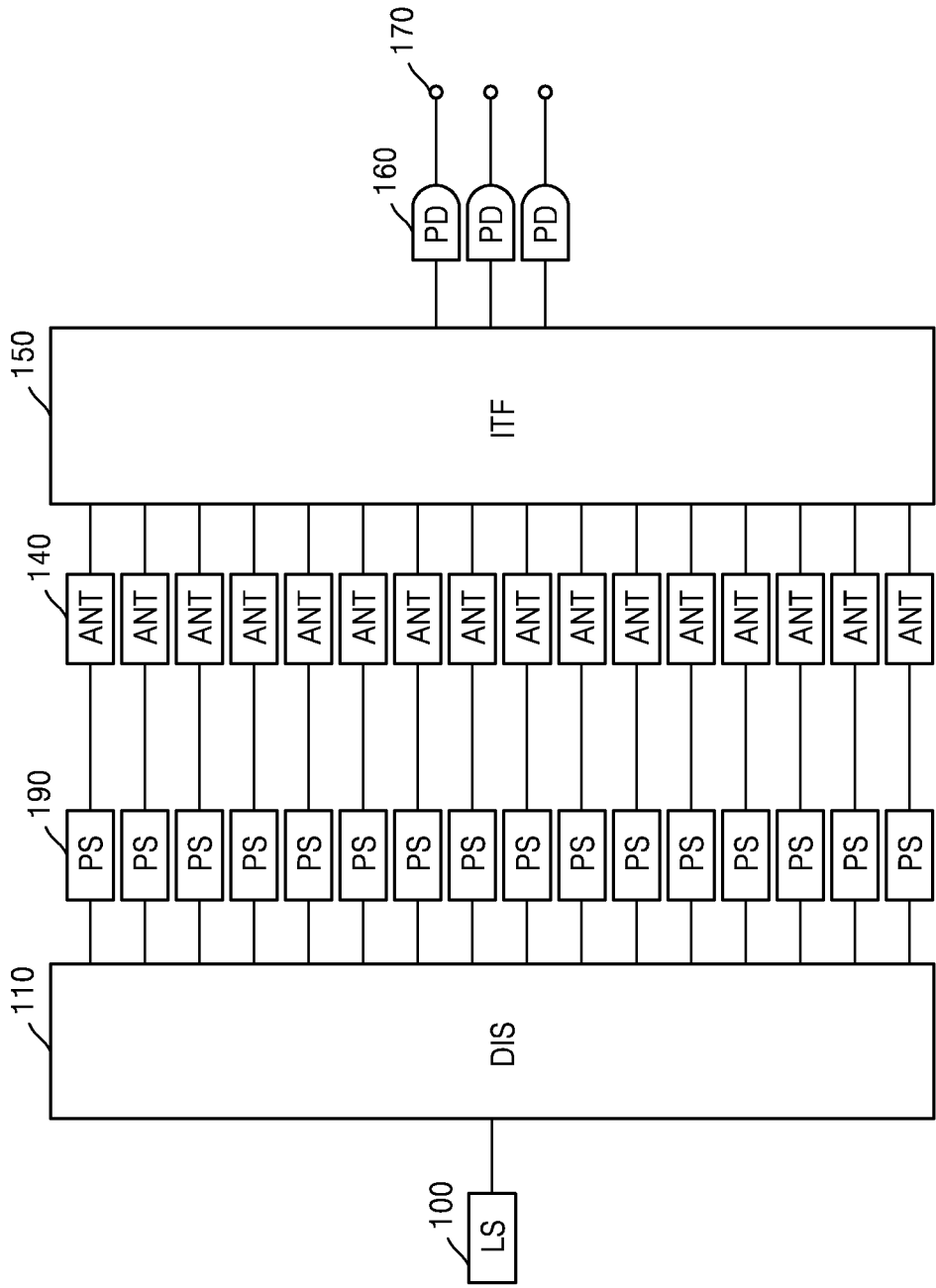

BEAM STEERING OPTICAL PHASED ARRAYS

CROSS-REFERENCE TO RELATED APPLICATIONS

This application claims the benefit, under 35 U.S.C. § 119, of Korean Patent Application No. 10-2016-0172898, filed on Dec. 16, 2016, in the Korean Intellectual Property Office, the disclosure of which is incorporated herein in its entirety by reference.

BACKGROUND

The inventive concepts relate to beam steering optical phased arrays (OPAs), and more particularly to beam steering OPAs configured to correct errors due to process dispersion.

The beam steering OPA is a device that is configured to output ("emit") a beam having a certain ("particular") radiation pattern by using an optical frequency band. Since a beam steering OPA is configured to use shorter wavelengths than radio frequencies, the beam steering OPA may be adequate for integration and may be implemented in a small-size device at a relatively low cost of manufacture. Such a beam steering OP may be utilized in autonomous vehicles, artificial intelligence robots, etc.

SUMMARY

The inventive concepts provide beam steering optical phased arrays (OPAs) having enhanced reliability.

According to some example embodiments of the inventive concepts, a beam steering optical phased array (beam steering OPA) may include an optical signal distributor, a plurality of phase shifters, a plurality of antennas, and an optical signal interferometer. The optical signal distributor may include a plurality of output terminals. The optical signal distributor may be configured to divide and output a plurality of optical signals through separate, respective output terminals of the plurality of output terminals. The plurality of phase shifters may be coupled to separate, respective output terminals of the plurality of output terminals. The plurality of phase shifters may be configured to receive separate, respective optical signals of the plurality of optical signals and shift phases thereof to generate a plurality of phase-shifted optical signals. The plurality of antennas may be configured to receive, from the plurality of phase shifters, the plurality of phase-shifted optical signals. The optical signal interferometer may include a plurality of first input waveguide regions connected to a limited selection of the plurality of antennas and extending in a first direction, a multi-mode waveguide region connected to the plurality of first input waveguide regions, and a first output waveguide region connected to the multi-mode waveguide region and extending in the first direction.

According to some example embodiments of the inventive concepts, a beam steering optical phased array (beam steering OPA) may include an optical signal distributor, the optical signal distributor including an input terminal and a plurality of output terminals, a plurality of phase shifters connected to separate, respective output terminals of the plurality of output terminals, a plurality of antennas connected to separate, respective phase shifters of the plurality of phase shifters, and an optical signal interferometer. The optical signal interferometer may include a plurality of first input waveguide regions connected to separate, respective antennas of the plurality of antennas and extending in a first direction, a multi-mode waveguide region connected to the plurality of first input waveguide regions, and an output waveguide region connected to the multi-mode waveguide region and extending in the first direction.

According to some example embodiments of the inventive concepts, a beam steering optical phased array (beam steering OPA) may include an optical signal distributor and a plurality of phase shifters. The optical signal distributor may include a plurality of output terminals. The optical signal distributor may be configured to divide and output a plurality of optical signals through separate, respective output terminals of the plurality of output terminals. The plurality of phase shifters may be coupled to separate, respective output terminals of the plurality of output terminals. The plurality of phase shifters may be configured to receive separate, respective optical signals of the plurality of optical signals and shift phases thereof to generate a plurality of phase-shifted optical signals.

BRIEF DESCRIPTION OF THE DRAWINGS

Example embodiments of the inventive concepts will be more clearly understood from the following detailed description taken in conjunction with the accompanying drawings in which:

FIG. 1A, FIG. 1B, FIG. 1C, and FIG. 1D are block diagrams of beam steering optical phased arrays (OPAs) according to some example embodiments;

DETAILED DESCRIPTION OF THE EMBODIMENTS

FIG. 1A, FIG. 1B, FIG. 1C, and FIG. 1D are block diagrams of beam steering optical phased arrays (OPAs) 10a through 10d according to some example embodiments.

Figure 1A:
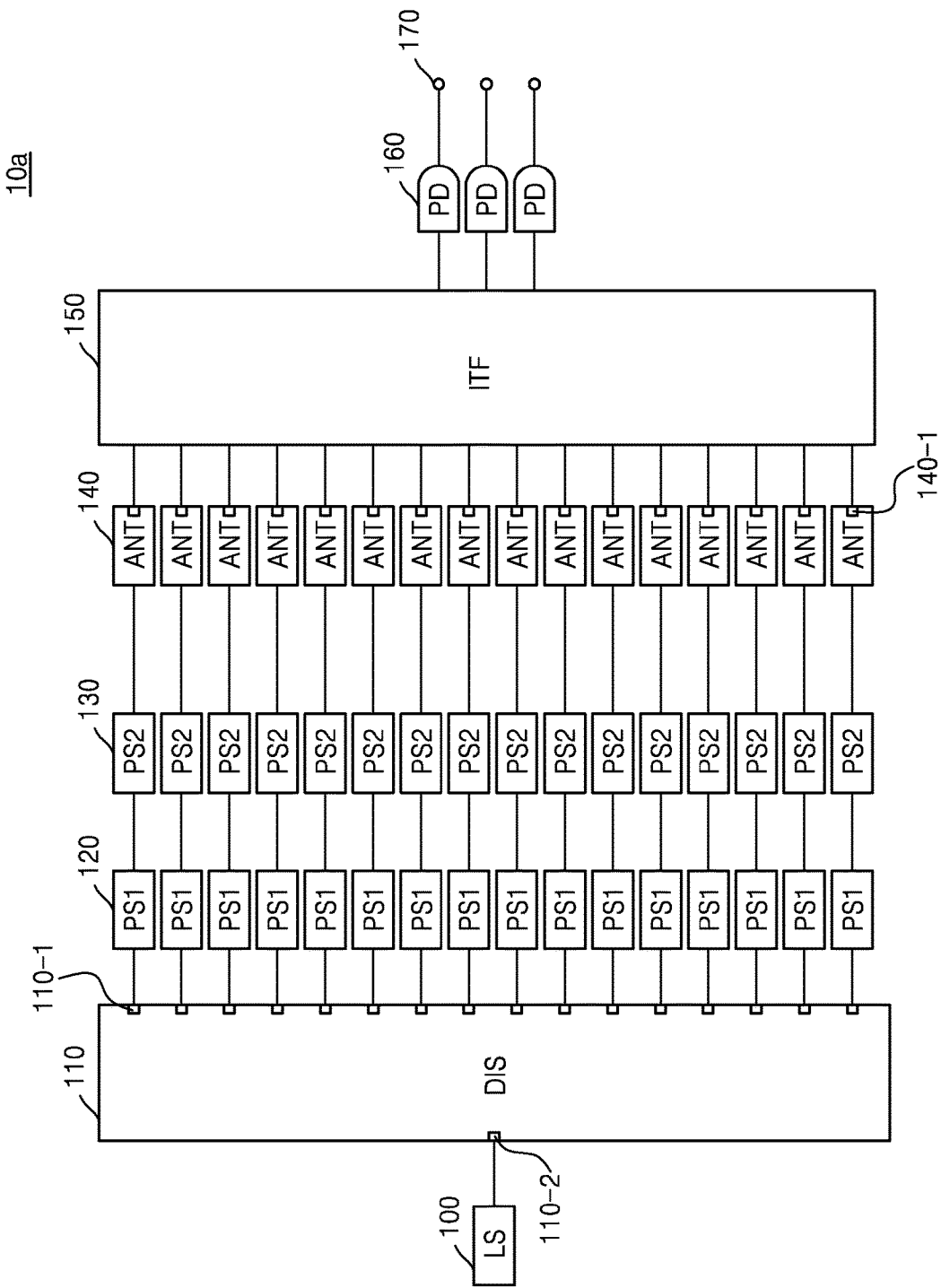

Referring to FIG. 1A, the beam steering OPA 10*a* may include a light source 100, an optical signal distributor 110, first phase shifters 120, second phase shifters 130, antennas 140, an optical signal interferometer 150, and photoelectric converters 160. As an example, the beam steering OPA 10*a* including sixteen of the first phase shifters 120, sixteen of the second phase shifters 130, and sixteen of the antennas 140 is described. However, the example embodiments are not limited thereto.

Figure 3:
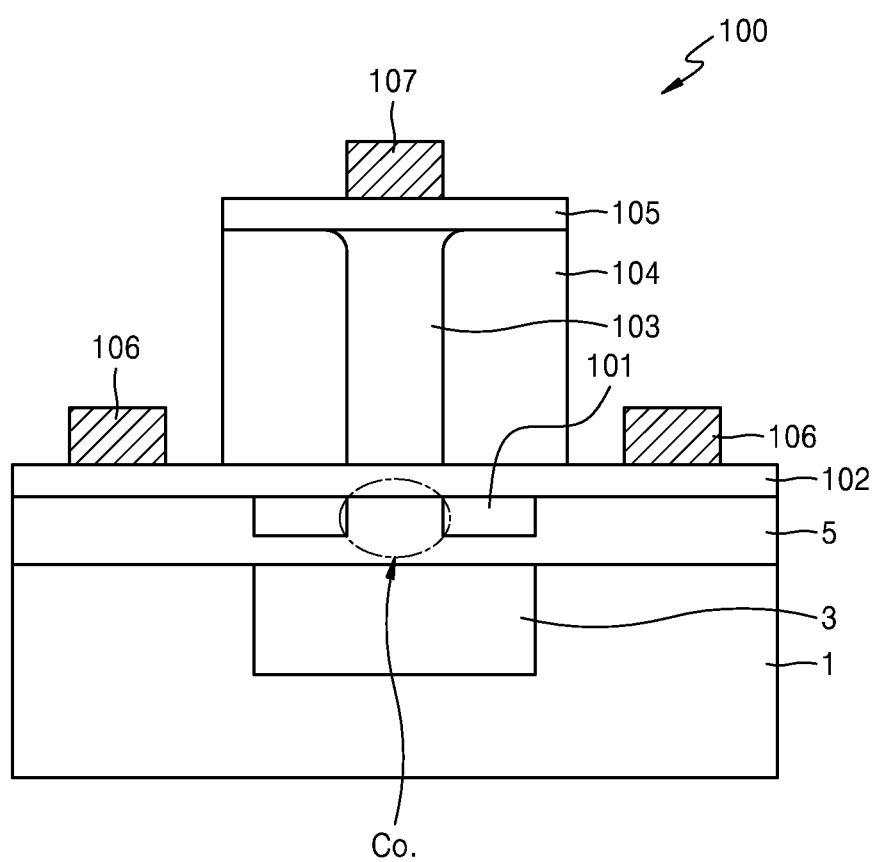
FIG. 3 is a cross-sectional view of a light source included in a beam steering OPA, according to some example embodiments.

The light source 100 may be a semiconductor laser element based on a semiconductor substrate (refer to 1 in FIG. 3). The light source 100 may be manufactured in a small size on a size order of hundreds of microns. In addition, since the light source 100 may use relatively little driving power, a laser beam may be directly modulated via current application. The light source 100 may obtain an oscillation wavelength ranging from visible light to infrared rays via a combination of semiconductor materials. In some example embodiments, the light source 100 may be a wavelength-tunable laser diode capable of changing an oscillation wavelength in a certain range. The light source 100 may output a laser beam in a type of a pulse wave or a continuous wave.

Referring to FIG. 1A, the light source 100 is illustrated as being included in the beam steering OPA 10*a* and composing ("at least partially comprising") a single integrated circuit (IC). However, the example embodiments are not limited thereto. If and/or when the beam steering OPA 10*a* does not include the light source 100, a light source arranged outside the beam steering OPA 10*a* may be combined with the beam steering OPA 10*a* via an optical fiber, a grating coupler, an edge coupler, etc.

The optical signal distributor 110 may be an optical dividing element which evenly divides light or an optical signal which is input into a plurality thereof and outputs the divided light or optical signal. The optical signal distributor 110 may be formed on a bulk-silicon (Si) substrate. The optical signal distributor 110 may include a star coupler, a multi-mode interferometer, a Y-branch splitter, a directional coupler, etc., which are formed on the semiconductor substrate 1. As shown in FIG. 1A, the optical signal distributor 110 may include a plurality of output terminals 110-1 and one or more input terminals 110-2. The number ("quantity") of input terminals 110-2 may be fewer than the number of output terminals 110-1.

According to some example embodiments, the optical signal distributor 110 included in the beam steering OPA 10*a* that may receive a plurality of outputs may include one star coupler, one multi-mode interferometer, or one directional coupler. According to some example embodiments, the optical signal distributor 110 included in the beam steering OPA 10*a* that may receive a plurality of outputs may have a serial or parallel structure combining some of the star coupler, the multi-mode interferometer, the directional coupler, and the Y-branch splitter. If and/or when the optical signal distributor 110 includes elements having characteristics of 1:2 optical signal distribution, the optical signal distributor 110 may have a full binary tree structure.

Each of the first phase shifters 120 may change a phase of light or an optical signal which is input and output a result thereof. Such a result may be referred to as a phase-shifted light or a phase-shifted optical signal, respectively. In other words, each of the first phase shifters 120 may apply to a waveguide any one of heat, light, current, voltage, and pressure, and change a phase of the optical signal passing through the waveguide. Each of the first phase shifters 120 may change a phase of an optical signal received from the optical signal distributor 110 in a range of about 0 to about 2π. Thus, the first phase shifters 120 may change the phases of separate, respective optical signals received from the optical signal distributor 110 to generate separate, respective phase-shifted optical signals of a plurality of phase-shifted optical signals. As referred to herein, the optical signals output from and/or received from one or more first phase shifters 120 may be referred to herein as one or more "phase-shifted optical signals." However, the example embodiments are not limited thereto. A portion of the first phase shifters 120 may change the phase of the optical signal according to ranges different from those of another portion of the first phase shifters 120 to generate phase-shifted optical signals having different phases from each other.

Each of first phase shifters 120 may be formed on the semiconductor substrate 1. Each of the first phase shifters 120 may be, for example, a resistive heater, a PIN phase shifter, a PN phase shifter, or a silicon-insulator-silicon capacitive (SISCAP) phase shifter. The resistive heater may be arranged around the waveguide and may change an optical signal phase by applying heat to the waveguide. The PIN phase shifter may change an optical signal phase by applying current to the waveguide in a horizontal direction via a PIN diode structure. The PN phase shifter may change an optical signal phase by applying voltage to the waveguide in a vertical direction via a PN diode structure. The SISCAP phase shifter may change an optical signal phase by applying voltage to the waveguide in a vertical direction via a SISCAP waveguide structure.

Each of the first phase shifters 120 may change optical signals input to the antenna 140 to have different phases from each other. If and/or when phases of the optical signals input to the antenna 140 are changed, phases of radiation waves output from the antenna 140 may be changed. By using this feature, a phase of each of the radiation waves of respective antennas 140 may be adequately adjusted via the first phase shifters 120, and light flux combined with phase-adjusted radiation waves may be steered in a certain direction. In other words, in the beam steering OPA 10*a*, the phase of each of the radiation waves of respective antennas 140 may be adequately adjusted via the first phase shifter 120 and a certain radiation pattern may be output via interference due to each radiation wave. The first phase shifters 120 may be controlled by a steering signal.

The first phase shifters 120 may be respectively arranged at (e.g., coupled to separate, respective) output terminals 110-1 of the optical signal distributor 110. The second phase shifters 130 may be respectively arranged at output terminals 110-1 of the optical signal distributor 110. If and/or when the first phase shifters 120 are arranged at a portion of the output terminals 110-1 of the optical signal distributor 110, the second phase shifters 130 may be arranged at output terminals of the first phase shifters 120. A structure or function of the second phase shifters 130 may be substantially the same (e.g., the same within manufacturing tolerances and/or material tolerances) as the first phase shifters 120. For example, the second phase shifters 130 may also change a phase of an input optical signal and output the result, and may include the resistive heater, the PIN phase shifter, the PN phase shifter, the SISCAP phase shifter, etc.

In some example embodiments, the function of the second phase shifters 130 may be different from that of the first phase shifters 120. The second phase shifters 130 may correct for dispersion of the optical signal of each antenna 140. Phase errors between optical signals at the output terminals of the optical signal distributor 110 may occur due to process dispersion. Accordingly, radiation patterns different from those intended by the antennas 140 may be output. The process dispersion may include dispersion along a vertical thickness of the substrate depending on a location on the substrate, side surface roughness occurring at formation of the optical waveguide, etc. The second phase shifters 130 may correct for the process dispersion. The second phase shifters 130 may be controlled by trimming signals.

Referring to FIG. 1A, the first phase shifter 120 and the second phase shifter 130 are illustrated as individual elements. Since the first phase shifters 120 execute light steering that controls the radiation patterns of the antennas 140, the first phase shifters 120 may use elements having a fast response speed. The first phase shifters 120 may correspond to, for example, the PN phase shifter or the PIN phase shifter. Since the second phase shifters 130 execute correction for the process dispersion, not the light steering, the second phase shifters 130 may not be associated with a response speed that is as fast as the response speed of the first phase shifters 120. Thus, each of the second phase shifters 130 may have a type of phase shifter such as the resistive heater which has relatively less optical loss. Because the process dispersion may be corrected by the second phase shifters 130, the accuracy of data generated by a device that includes the beam steering OPA 10a based on the optical signals output by the second phase shifters 130 may be improved and the beam steering OPA may have enhanced reliability. If and/or when the beam steering OPA 10a is used to generate sensor data, the second phase shifters 130 may enable improved accuracy of data generated by the beam steering OPA 10a and may enable reduced costs to manufacture and/or maintain the beam steering OPA 10a.

Referring to FIG. 1A, the beam steering OPA 10a is illustrated to include the same number, sixteen, of the second phase shifters 130 and sixteen antennas 140. However, the example embodiments are not limited thereto. If and/or when phases of other antennas 140 are corrected based on an optical signal phase of one antenna selected from the antennas 140, the optical signal phase of the selected antenna may be maintained without correction. Thus, a phase shifter of the second phase shifters 130 corresponding to the selected antenna of the antennas 140 may be omitted. According to some example embodiments, the beam steering OPA 10a may include sixteen or fifteen of the second phase shifters 130.

The antennas 140 may correspond to respective channels and be connected to the output terminals of the optical signal distributor 110. In some example embodiments, a channel may denote a path through which an optical signal passes. Each of the antennas 140 may be connected to each of output terminals of the second phase shifters 130 respectively arranged at the output terminals of the optical signal distributor 110. The antennas 140 may also be formed on the bulk-Si substrate and in a structure in which a grid is engraved in the waveguide. The antennas 140 may each receive an optical signal from the first phase shifters 120 or the second phase shifters 130 (e.g., phase-shifted optical signals). The antennas 140 may output a portion of input optical signals in a radiation wave type. The antennas 140 may transmit a portion of received optical signals to the optical signal interferometer 150.

The optical signal interferometer 150 may be an optical interference element which receives the optical signals from the antennas 140 and outputs one or more of the optical signals. The optical signal interferometer 150 may receive remaining optical signals from the antennas 140. A first input waveguide region (151 in FIG. 7A) of the optical signal interferometer 150 may be connected to remaining output terminals 140-1 of the antennas 140. The remaining output terminals 140-1 may denote output terminals through which the remaining optical signals of the antennas 140 are output. The remaining optical signals may denote a remainder of the optical signals, except for optical loss, which have been output in the radiation pattern from the antennas 140.

In some example embodiments, a radiation efficiency of the antennas 140 may be generally less than about 100%. Thus, in an actual case, since the remaining optical signals generated in the antennas 140 proceed along previously-formed waveguides, the optical signal interferometer 150 may not further include a separate element for extracting or transmitting the remaining optical signals.

The optical signal interferometer 150 may be an optical interference element which combines a plurality of optical signals input from the antennas 140 and outputs at least one or more of the optical signals. The optical signal interferometer 150 may include a plurality of first input waveguide regions (151 in FIG. 7A). The optical signal interferometer 150 may include at least one output waveguide region (refer to 155a and 155b in FIGS. 7A through 7C). Referring to FIG. 1A, the optical signal interferometer 150 is illustrated to receive optical signals from sixteen antennas 140 and output three optical signals. However, the example embodiments are not limited thereto. The optical signal interferometer 150 may include two to fifteen or more than seventeen input terminals, or an odd number of input terminals.

The optical signal interferometer 150 may be formed on the semiconductor substrate 1. The optical signal interferometer 150 may include a star coupler, a multi-mode interferometer, a Y-branch interferometer, the directional coupler, etc. which are formed on the semiconductor substrate 1. As described above, the optical signal interferometer 150 may be an element which combines a plurality of light beams or optical signals and outputs at least one optical signal. Accordingly, when the optical signal interferometer 150 includes one output, the optical signal interferometer 150 may have an inverse structure of the optical signal distributor 110 described above. In some example embodiments, structures of the optical signal distributor 110 and the optical signal interferometer 150 may be symmetrical. However, the example embodiments are not limited thereto.

The optical signal interferometer 150 may include one star coupler, the multi-mode interferometer, and the directional coupler. According to some example embodiments, the optical signal interferometer 150 may have a serial or parallel structure combining some of the star coupler, the multi-mode interferometer, the directional coupler, and the Y-branch splitter. The optical signal interferometer 150 may include a multi-mode interferometer that is a many-to-one multi-mode interferometer.

The photoelectric converters 160 may change the optical signals transmitted from the optical signal interferometer 150 into signals of a different type. For example, the photoelectric converters 160 may change the optical signals received from the optical signal interferometer 150 into electrical signals. The photoelectric converters 160 may include a photovoltaic detector, a photoconductive detector, an avalanche photodiode (APD), a photo transistor, etc. The photoelectric converters 160 may have a fast response speed, a wide sensitivity frequency band, and good linearity of photocurrent.

Since the optical signal interferometer 150 and the photoelectric converters 160 can operate with only a limited portion of the optical signals transmitted to the antennas 140, the optical signal interferometer 150 and the photoelectric converters 160 may have little effect on overall radiation efficiency. A sufficient amount of the remaining optical signals for the operations of the optical signal interferometer 150 and the photoelectric converters 160 may be about 0.01% of original optical signals. However, the example embodiments are not limited thereto.

Outside terminals 170 may be terminals connected to output terminals of the photoelectric converters 160 and may be configured so that electrical signals, etc. output by the photoelectric converters 160 can be read from the outside.

Although not shown, a semiconductor optical amplifier may be further included at the output terminal of the light source 100 or at the output terminals of the second phase shifters 130. The semiconductor optical amplifier may be realized as a Fabry-Perot amplifier (FPA) type, a travelling wave amplifier (TWA), or another type. The semiconductor optical amplifier may be manufactured in a small size, operable at various frequency bands, and capable of bi-directional transmission.

FIG. 1B is a block diagram of the beam steering OPA 10b according to some example embodiments. Descriptions of content overlapping with content in FIG. 1A will be omitted and only differences will be mainly described.

Referring to FIG. 1B, the beam steering OPA 10b may include third phase shifters 190, unlike the beam steering OPA (10a of FIG. 1A), according to some example embodiments. A structure of the third phase shifters 190 may be substantially the same (e.g., the same within manufacturing tolerances and/or material tolerances) as the first phase shifters 120. Each of the third phase shifters 190 may further transmit a steering signal which is biased based on errors due to the process dispersion. Each of the third phase shifters 190 may execute phase shifting in a range of about 0 to about 2π. Thus, the third phase shifters 190 may change phases of optical signals input to the antennas 140 and simultaneously correct the errors ("phase errors") due to the process dispersion. In other words, the third phase shifters 190 may execute all functions of the first phase shifter 120 and the second phase shifter 130 described with reference to FIG. 1A. In some example embodiments, the third phase shifters 190 may be controlled by the trimming signal and the steering signal. Accordingly, one of the third phase shifters 190 may correspond to one of the antennas 140, which may be advantageous in forming an IC.

Figure 1C:
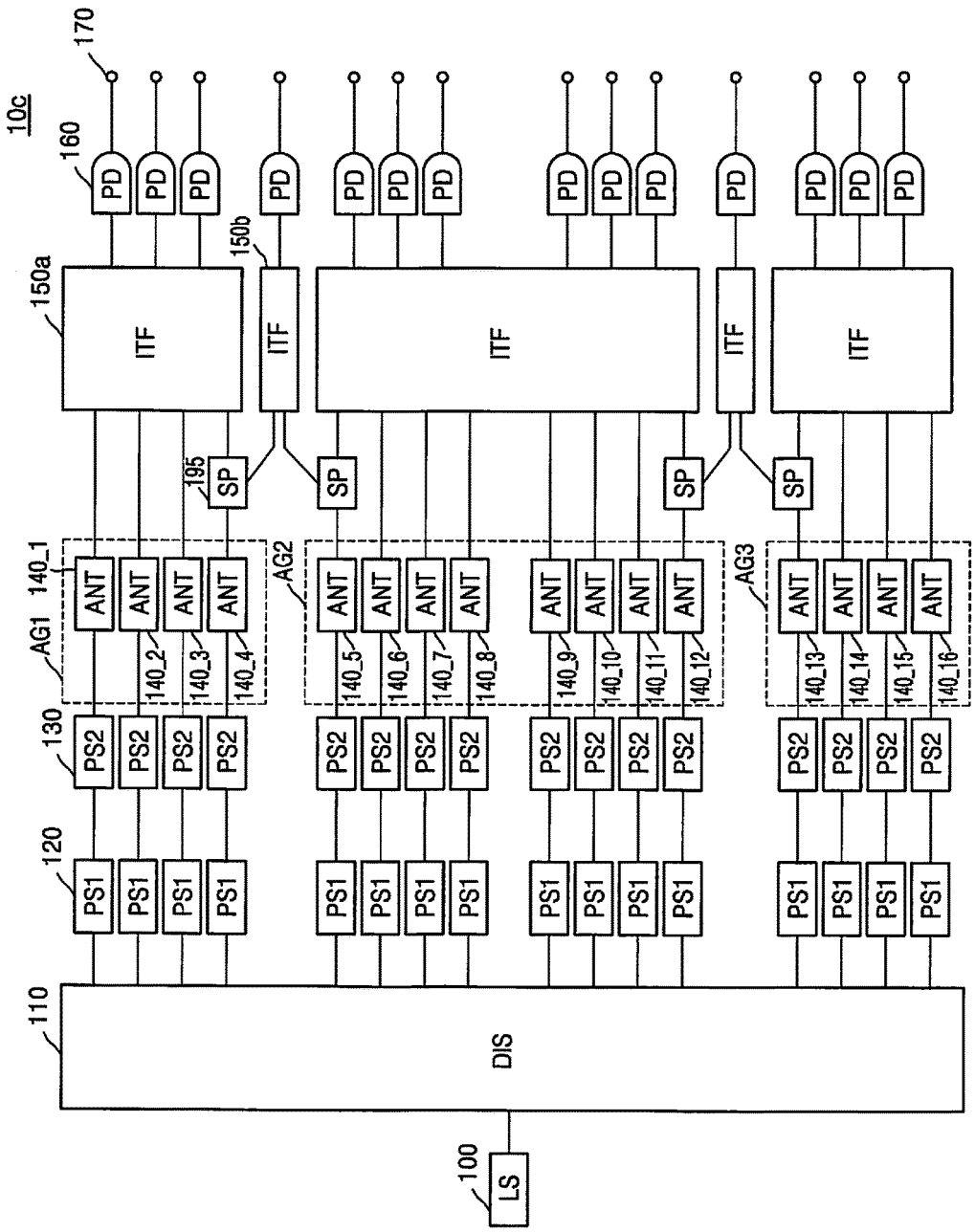

FIG. 1C is a block diagram of the beam steering OPA 10c according to some example embodiments. Descriptions of content overlapping with content in FIG. 1A will be omitted and only differences will be mainly described.

Referring to FIG. 1C, the beam steering OPA 10c may include first through sixteenth antennas 140_1 through 140_16, according to some example embodiments. In the drawing, an antenna at the top through an antenna at the bottom may be respectively defined as the first through sixteenth antennas 140_1 through 140_16. In addition, the beam steering OPA 10c may include a plurality of first optical signal interferometers 150a and a plurality of second optical signal interferometers 150b, unlike the beam steering OPA 10a described with reference to FIG. 1A, according to some example embodiments. In some example embodiments, the beam steering OPA 10c may include the optical signal interferometers 150a and 150b having different types from each other.

The beam steering OPA 10c may include the first and second optical signal interferometers 150a and 150b having an unequal correspondence. The unequal correspondence may denote that a number of the antennas 140 corresponding to a portion of the optical signal interferometers is different from a number of the antennas 140 corresponding to another portion of the optical signal interferometers. As illustrated in FIG. 1C, eight antennas 140 may correspond to a portion of the optical signal interferometers 150a and four antennas 140 may correspond to another portion of the optical signal interferometers 150a, while two antennas 140 may correspond to another optical signal interferometer 150b.

The first through fourth antennas 140_1 through 140_4 may constitute a first antenna group AG1, the eighth through twelfth antennas 140_8 through 140_12 may constitute a second antenna group AG2, and the thirteenth through sixteenth antennas 140_13 through 140_16 may constitute a third antenna group AG3.

The first through third antenna groups AG1 through AG3 may respectively correspond to the first optical signal interferometers 150a which are different from each other. The first optical signal interferometer 150a may be used for correcting errors due to the process dispersion between respective antennas 140 of the first through third antenna groups AG1 through AG3. The second optical signal interferometer 150b may be used for correcting errors due to the process dispersion between antenna groups different from each other. The second optical signal interferometer 150b may be arranged at output terminals of optical signal branching elements 195 which are described later.

The optical signal branching elements 195 may be arranged between a portion of antennas 140, of the total number ("quantity") of antennas 140, and between the first and second optical signal interferometers 150a and 150b. The optical signal branching elements 195 may correspond to antennas adjacent to each other but corresponding to different optical signal interferometers from each other. However, the example embodiments are not limited thereto. Each of the antennas 140 that is adjacent to another antenna group may be connected to one of the optical signal branching elements 195. However, the example embodiments are not limited thereto. The optical signal branching elements 195 may be arranged at remaining output terminals of the fourth, fifth, twelfth, and thirteenth antennas 140_4, 140_5, 140_12, and 140_13. The optical signal branching elements 195 or the first optical signal interferometer 150a may be arranged at the remaining output terminals of the antennas 140.

Each of the optical signal branching elements 195 may include a 1:2 star coupler splitter, a 1:2 multi-mode inter-ferometer splitter, the Y-branch splitter, a 1:2 directional coupler splitter, etc. Each of the optical signal branching elements 195 may be an element which distributes one input optical signal as two output optical signals. However, the example embodiments are not limited thereto. Each of the optical signal branching elements 195 may output one input optical signal as two equal output optical signals.

Figure 1D:
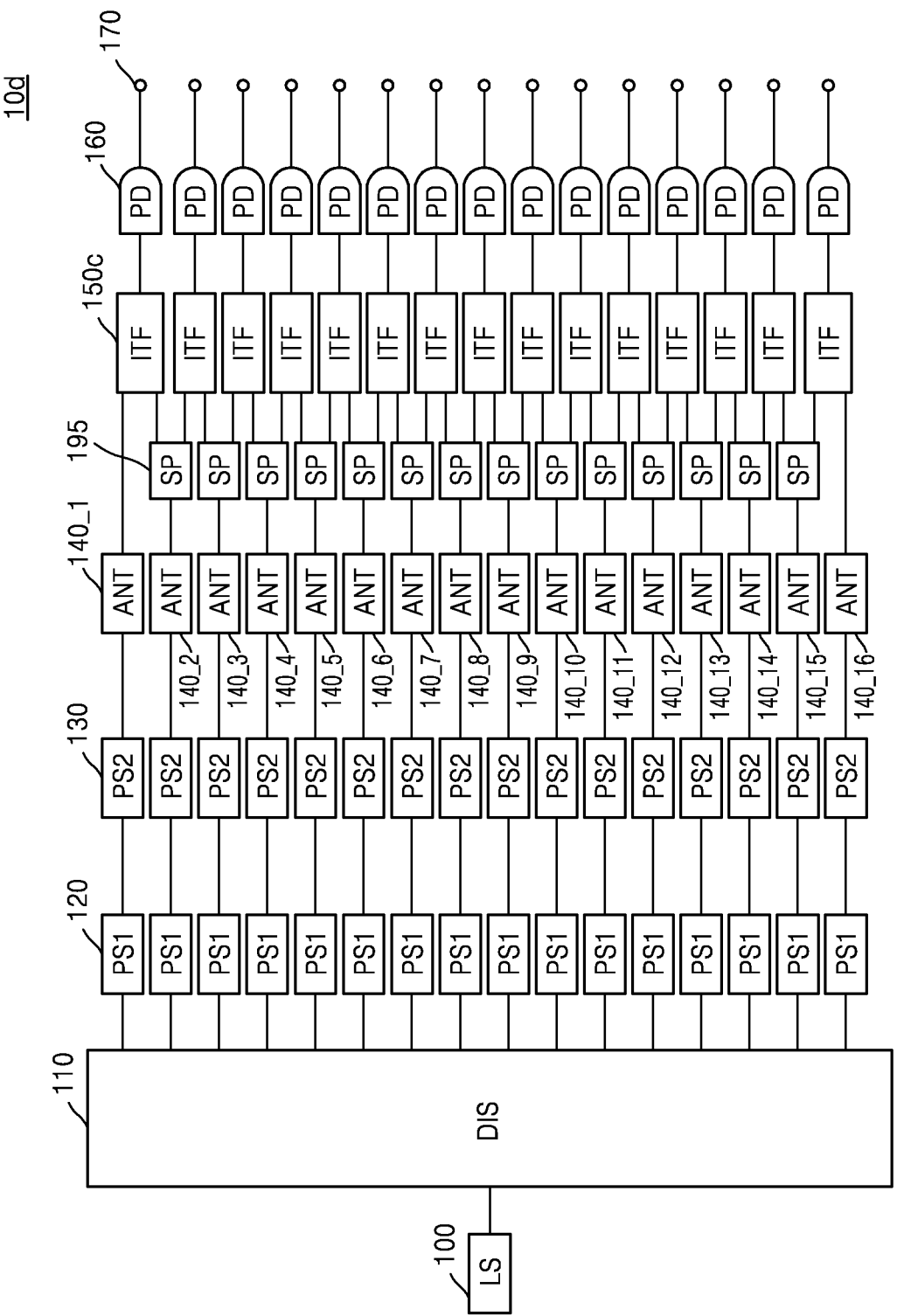

FIG. 1D is a block diagram of the beam steering OPA 10d according to some example embodiments. Descriptions of content overlapping with content in FIG. 1C will be omitted and only differences will be mainly described.

Referring to FIG. 1D, the antennas 140 may include the first through sixteenth antennas 140_1 through 140_16, like in FIG. 1C. The optical signal branching elements 195 may be arranged at remaining output terminals of a portion of the antennas 140. The optical signal branching elements 195 may be arranged at remaining output terminals of the antennas 140_2 through 140_15, and not at the first and sixteenth antennas 140_1 and 140_16 which are the outermost antennas of the antennas 140. The optical signal branching elements 195 may be arranged at remaining output terminals of the second through fifteenth antennas 140_2 through 140_15. Third optical signal interferometers 150c may be arranged at remaining output terminals of the optical signal branching elements 195 or at remaining output terminals of a portion of the antennas 140. The third optical signal interferometers 150c may be directly arranged at remaining output terminals of the antennas 140 at which the optical signal branching elements 195 are not arranged. The third optical signal interferometers 150c may be directly arranged at remaining output terminals of the first and sixteenth antennas 140_1 and 140_11.

Each of the third optical signal interferometers 150c may be, for example, a 2:1 multi-mode interferometer. However, the example embodiments are not limited thereto. Each of the third optical signal interferometers 150c may be a 2:j multi-mode interferometer, where the j is an integer equal to or greater than 2. The photoelectric converters 160 may be arranged in an output waveguide region of the third optical signal interferometers 150c.

Figure 2:
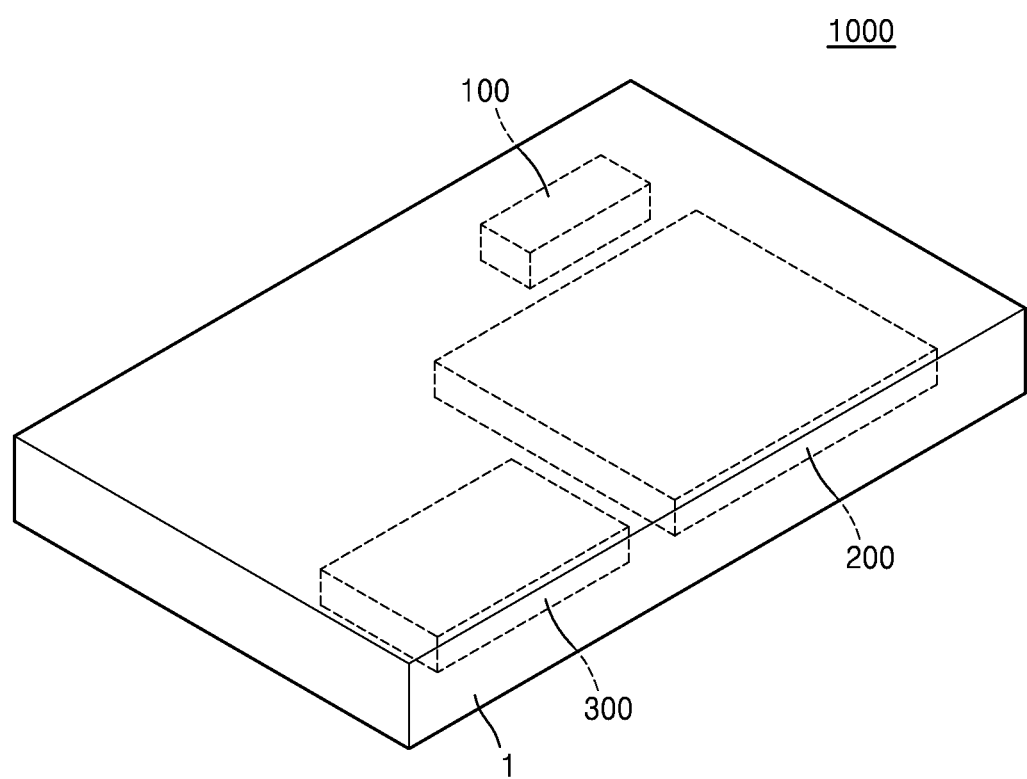
FIG. 2 is a perspective view of a photonic integrated circuit (IC) including a beam steering OPA, according to some example embodiments.

FIG. 2 is a perspective view of a photonic IC 1000 including a beam steering OPA, according to some example embodiments.

Referring to FIG. 2, the photonic IC 1000 may include the light source 100, a beam steering OPA 200, and a receiver 300, which are integrated in the semiconductor substrate 1, according to some example embodiments. A structural arrangement of the beam steering OPA 200, the light source 100, and the receiver 300 in the semiconductor substrate 1 may not be limited to that of FIG. 2, but may be variously changed.

The light source 100 may be substantially the same (e.g., the same within manufacturing tolerances and/or material tolerances) as the light source 100 described with reference to FIG. 1A and may be omitted when a light source is included in the beam steering OPA 200. The beam steering OPA 200 may correspond to the beam steering OPAs 10a, 10b, 10c, and 10d of FIGS. 1A, 1B, 1C, and 1D, respectively.

The receiver 300 may be a sensor receiving optical signals that have been radiated by the antennas (140 in FIG. 1A), reflected by surrounding objects, and returned therefrom. For example, the receiver 300 may include a photodiode based on the semiconductor substrate 1. The receiver 300 may include a plurality of photodiodes arranged in an array structure in the semiconductor substrate 1. The receiver 300 may also include one photodiode.

The semiconductor substrate 1 may include a semiconductor such as Si or Ge, or a compound semiconductor such as SiGe, SiC, GaAs, InAs, or InP. In some example embodiments, the semiconductor substrate 1 may have a silicon-on-insulator (SOI) structure. The semiconductor substrate 1 may include conductive regions, for example, wells doped with impurities or structures doped with impurities.

In the photonic IC 1000, the beam steering OPA 200, the light source 100, and the receiver 300 may be integrated in the semiconductor substrate 1 via silicon photonics technology, according to some example embodiments. The silicon photonics technology may denote technology for forming semiconductors based on silicon substrates. According to some example embodiments, the photonic IC 1000 may realize an optical element system which, by integrating various optical elements in the semiconductor substrate 1, is miniaturized at a low cost and has enhanced reliability. For example, the photonic IC 1000 may constitute a light detection and ranging (LiDAR) system by using controllers controlling the beam steering OPA 200, the light source 100, and the receiver 300, according to some example embodiments.

In some example embodiments, the photonic IC 1000 may be included in one or more portions of a vehicle, including an automobile. A vehicle may include a vehicle that is configured to be driven ("navigated") manually (e.g., based on manual interaction with one or more driving instruments of the vehicle by at least one occupant of the vehicle), a vehicle that is configured to be driven ("navigated") autonomously (e.g., an autonomous vehicle configured to be driven based on at least partial computer system control of the vehicle with or without input from vehicle occupant(s)), some combination thereof, or the like. For example, in some example embodiments, the vehicle may be configured to be driven ("navigated") through an environment based on generation of data by one or more photonic ICs 1000 included in the vehicle. Such navigation may include the vehicle being configured to navigate through an environment, in relation to an object located in the environment, based on data generated by the beam steering OPA 200 as a result of the photonic IC 1000 emitting a light beam into the environment and detecting the object in the environment, where the photonic IC 1000 may detect the object based on detecting a reflection and/or scattering of the emitted light beam off of the object.

In some example embodiments, based on the beam steering OPA 200 providing improved reliability, improved accuracy, improved compactness, and reduced cost, the beam steering OPA 200 may enable a vehicle to be configured to implement autonomous navigation of an environment, via incorporation of a photonic IC 1000 that includes the beam steering OPA 200, with improved reliability, reduced cost, and reduced space requirements within the vehicle to incorporate the photonic IC 1000 that may enable environment monitoring to further enable autonomous navigation through the environment.

FIG. 3 is a cross-sectional view of a light source 100 included in a beam steering OPA, according to some example embodiments.

Referring to FIG. 3, the light source 100 may be included in the beam steering OPA to form an integrated structure. The light source 100 may include, over the semiconductor substrate 1, an embedded insulating layer 3, an epitaxial layer 5, a side surface clad 101, a bottom side contact layer 102, an active region 103, a quantum implant layer 104, a top side contact layer 105, and conductive layers 106 and 107.

The embedded insulating layer 3 (in a box shape) may be formed in an upper region of the semiconductor substrate 1. For example, the embedded insulating layer 3 may include an oxide layer including a material such as silicon oxide (SiOx). In some example embodiments, the material of the embedded insulating layer 3 is not limited to the oxide layer.

The epitaxial layer 5 may be formed on the embedded insulating layer 3 and the semiconductor substrate 1. The epitaxial layer 5 may be formed via an epitaxial growth method. The epitaxial layer 5 may be formed on the semiconductor substrate 1 and the embedded insulating layer 3, for example, via a solid phase epitaxial (SPE) method.

The side surface clad 101 may be formed as a structure surrounding sides of a core Co. illustrated as a dotted ellipse. The side surface clad 101 may include a low insulating layer having a low refractivity like the silicon oxide layer, on an upper region of the epitaxial layer 5. In some example embodiments, the side surface clad 101 may penetrate through the epitaxial layer 5 and have a bottom side thereof in contact with the embedded insulating layer 3.

The bottom side contact layer 102 and the top side contact layer 105 may include conductive materials. For example, the bottom side contact layer 102 may include an n-type material layer and the top side contact layer 105 may include a p-type material layer. In some example embodiments, the bottom side contact layer 102 and the top side contact layer 105 may electrically connect the active region 103 and the conductive layers 106 and 107.

The active region 103 may be a region in which a laser beam is generated and may include group III/V materials. For example, the active region 103 may include an active layer at the center thereof, and carrier trapping layers on top and bottom sides thereof. The carrier trapping layers may include a separate confinement hetero (SCH) layer. Active layers may include p-type or n-type GaAs. The carrier trapping layer on the top side may be a p-type SCH layer and include p-type $Al_xGa_{1-x}As$. The carrier trapping layer on the bottom side may be a p-type SCH layer and include n-type $Al_xGa_{1-x}As$. Materials of the active layer and the carrier trapping layers are not limited to these materials.

The quantum implant layer 104 may be arranged on two sides of the active layer of the active region 103 and act as a type of current constricting layer executing a function of current constriction. In some example embodiments, the current constricting layer may be formed via selective side oxidation or mesa etching, instead of the quantum implant layer 104. The conductive layers 106 and 107 may respectively be formed on the bottom side contact layer 102 and the top side contact layer 105. The conductive layers 106 and 107 may include electrodes applying current to the active region 103. A p-type clad may be arranged between the top side contact layer 105 and the active region 103.

A structure of the light source 100 may not be limited to that of FIG. 3. According to some example embodiments, in the photonic IC 1000, the light source 100 may be formed to have various structures based on the semiconductor substrate 1. Accordingly, the light source 100 may be integrally formed at the time of manufacturing a beam steering OPA. Optical signals output by the light source 100 may not be limited to particular wavelength bands. For example, optical signals output by the light source 100 may correspond to various wavelength bands such as about 850 nm, about 905 nm, about 1060 nm, about 1310 nm, and about 1550 nm.

Figure 4A:
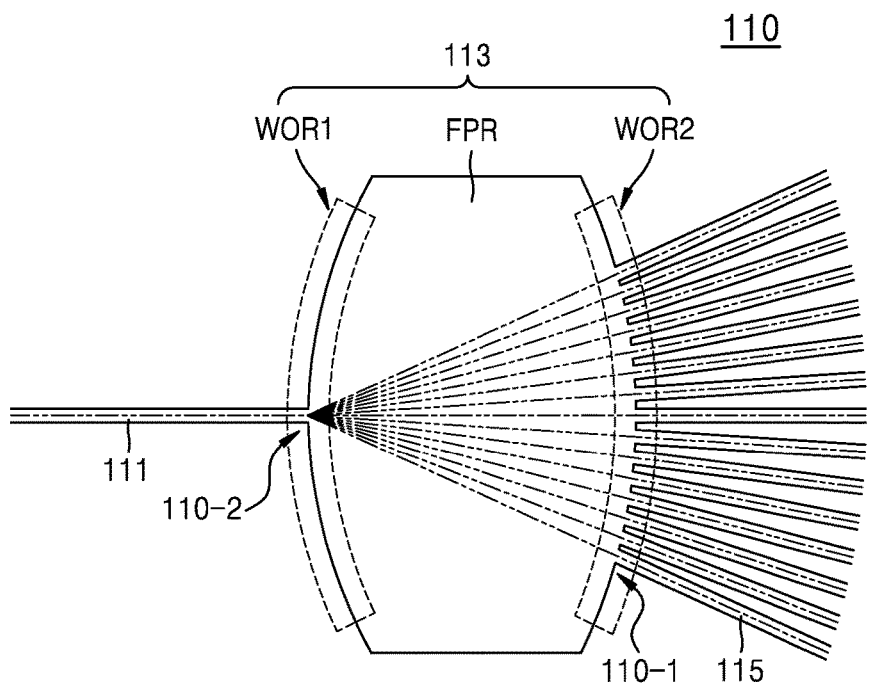
FIG. 4A and FIG. 4B are cross-sectional views of optical signal distributors included in an optical signal OPA, according to some example embodiments.
Figure 4B:
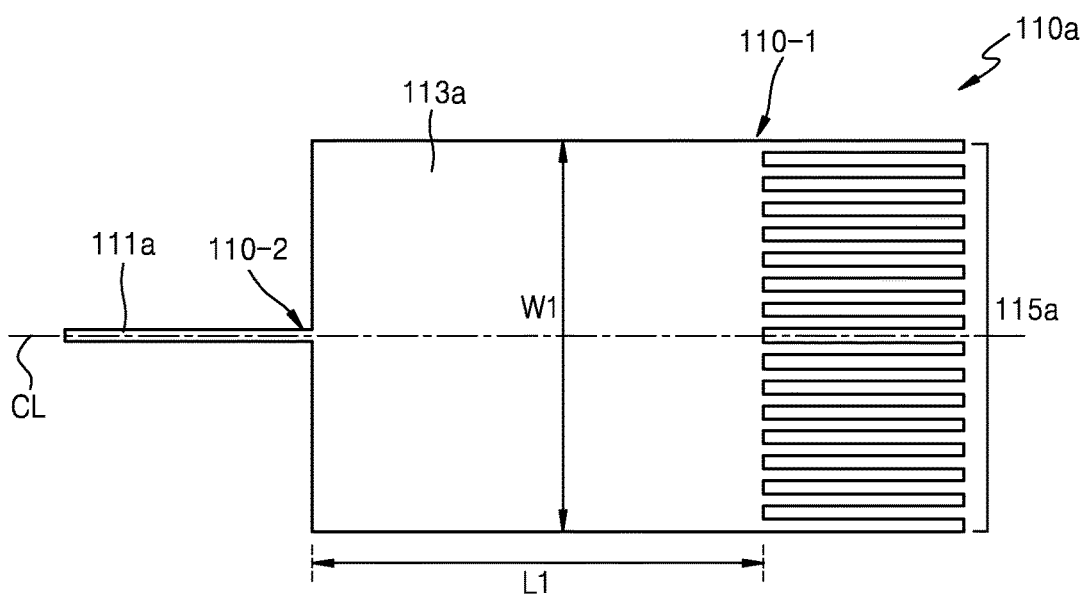

FIG. 4A and FIG. 4B are cross-sectional views of optical signal distributors included in an optical signal OPA, according to some example embodiments.

Referring to FIG. 4A, the optical signal distributor 110 may be the star coupler. The star coupler may be a passive element in which optical signals received at one or more input terminals 110-2 are distributed to output terminals 110-1 of a number greater than the one or more input terminals 110-2. The number of the output terminals 110-1 of the star coupler may be two to the $n^{th}$ power (n is an integer), but is not limited thereto.

The optical signal distributor 110 may include an input waveguide region 111, a dividing waveguide region 113, and a plurality of output waveguide regions 115. The input waveguide region 111 may receive an optical signal generated from a light source and may correspond to a waveguide as an optical signal region. The output waveguide region 115 may be a region to which signals divided by the dividing waveguide region 113 are transmitted.

The dividing waveguide region 113 may include a first waveguide-opening region WOR1, a free propagation region FPR, and a second waveguide-opening region WOR2. The first wave-guide opening region WOR1 may denote a region in which a waveguide of the input waveguide region 111 contacts the free propagation region FPR. The second waveguide-opening region WOR2 may be a region in which a series of waveguides of the output waveguide region 115 contact the free propagation region FPR. An optical signal input through the input waveguide region 111 may proceed through the dividing waveguide region 113 and be divided into a plurality of optical signals. In some example embodiments, the input optical signal may be output after being equally divided into sixteen optical signals via the dividing waveguide region 113. The free propagation region FPR may be a region defined by the first and second wave-guide opening regions WOR1 and WOR2. The free propagation region FPR may be configured so that the input optical signal propagates along a certain first plane while the input optical signal does not proceed along a second plane perpendicular to the first plane.

As illustrated in FIG. 4B, the optical signal distributor 110a may be a multi-mode interferometer. The optical signal distributor 110a may include an input waveguide region 111a, a first multi-mode waveguide region 113a, and a plurality of output waveguide regions 115a. The input waveguide region 111a may be arranged at a centerline CL portion of the first multi-mode waveguide region 113a. The output waveguide regions 115a may be separate from the centerline CL of the first multi-mode waveguide region 113a. The first multi-mode waveguide region 113a may have a first length L1 in a direction of the optical signal and a first width W1 in a direction substantially perpendicular (e.g., perpendicular within manufacturing tolerances and/or material tolerances) to this direction. In the first multi-mode waveguide region 113a, a relation between the first length L1 and the first width W1 may satisfy the formula $L1=N\cdot W1/(2\lambda)$ for dividing the optical signal into a plurality of optical signals via a multi-mode interference. In the formula, $\lambda$ may correspond to a wavelength of the optical signal and N may correspond to the number of divisions. For example, when the input optical signal is divided into 16 divisions, the first length L1 and the first width W1 may satisfy the formula $L1=16W1/(2\lambda)$.

The optical signal distributor 110a may include a center core structure or a hollow core structure on the semiconductor substrate 1. The center core structure may include a structure in which a clad is formed on bottom and top portions thereof, with a core of the epitaxial layer as a center. An air layer or a separate side surface clad may be arranged on sides of the core. The core through which the optical signal passes in the hollow core structure may be formed by the air layer. A metal coating may be formed on the sides surrounding the core so that the hollow core structure may be implemented on the semiconductor substrate 1.

Although not shown, to mitigate and/or prevent loss due to dispersion of the optical signal, an end portion of the input waveguide region 111a in contact with the first multi-mode waveguide region 113a may have a structure in which a width thereof gradually increases as the end portion approaches the first multi-mode waveguide region 113a. To mitigate and/or prevent loss due to dispersion of the optical signal, an end portion of each of the output waveguide regions 115a in contact with the first multi-mode waveguide region 113a may have a structure in which a width thereof gradually decreases as the end portion becomes farther from the first multi-mode waveguide region 113a. These configurations will be similarly applied to optical signal interferometers 150, 150', and 150" to be described later.

Figure 5A:
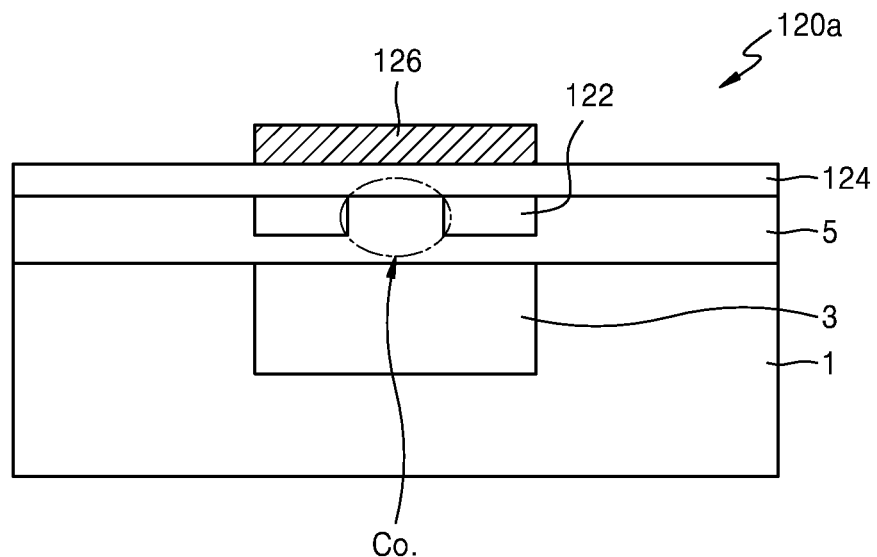
FIG. 5A and FIG. 5B are cross-sectional views of phase shifters included in a beam steering OPA, according to some example embodiments.
Figure 5B:
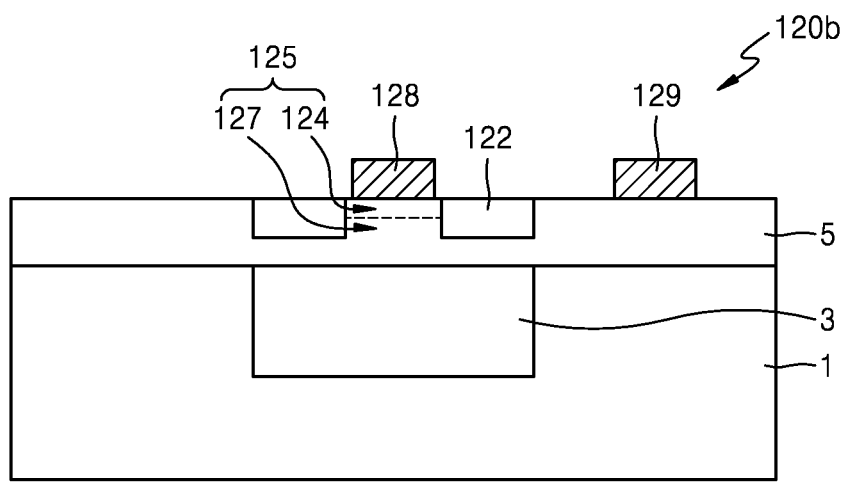

FIG. 5A and FIG. 5B are cross-sectional views of phase shifters included in a beam steering OPA, according to some example embodiments. In other words, each of the first phase shifters 120 in FIG. 1A may correspond to the first phase shifters 120a and 120b of FIGS. 5A and 5B.

Referring to FIG. 5A, the first phase shifter 120a may be a phase shifter using a thermo-optic effect, and may include a resistive heater 126 arranged around a waveguide. For example, the first phase shifter 120a may include, on the semiconductor substrate 1, the embedded insulating layer 3, the epitaxial layer 5, a side surface clad 122, a top portion clad 124, and the resistive heater 126. The semiconductor substrate 1, the embedded insulating layer 3, the epitaxial layer 5, and the core Co. represented by a dashed line may be substantially the same (e.g., the same within manufacturing tolerances and/or material tolerances) as those described with reference to FIG. 3.

The side surface clad 122 and the top portion clad 124 may constitute a structure surrounding side surfaces and a top surface of the core Co. The side surface clad 122 and the top portion clad 124 may include an insulating layer having a refractive index which is less than that of the core Co. For example, the side surface clad 122 and the top portion clad 124 may include an oxide layer such as the silicon oxide layer. The side surface clad 122 and the top portion clad 124 may include the same material or different materials.

The resistive heater 126 may be over a top portion of the core Co. and include Cr, Ni, nicrome, W, WSix, etc. If and/or when current is applied to the resistive heater 126, heat may be generated, temperature at a bottom portion of the waveguide, that is, in the core Co. may be locally increased, and thus, a phase of a beam passing through the waveguide may be changed. Depending on a temperature change (ΔT), a refractive index of the waveguide, that is, of core Co., may be changed in proportion to a thermo-optic coefficient of a material of the waveguide. A change in the refractive index of the core Co. may change relative phases between optical signals at different channels from each other. On the other hand, temperature of the semiconductor substrate 1 may be maintained constant via a thermo-electric cooling element or a heat-sink plate, and accordingly, a phase change of a beam may be maintained constant.

Referring to FIG. 5B, the first phase shifter 120b may be a phase shifter including a PN diode and may change a phase of an optical signal by applying a voltage in a direction perpendicular to the waveguide through which a beam passes. For example, the first phase shifter 120b may include, on the semiconductor substrate 1, the embedded insulating layer 3, the epitaxial layer 5, the side surface clad 122, a first electrode 128, and a second electrode 129. A waveguide 125 may have a vertical PN diode structure including a top portion clad 124 and a bottom portion layer 127.

In some example embodiments, the top portion clad 124 may be doped in a p-type and the bottom portion layer 127 may be doped in an n-type. In some example embodiments, the top portion clad 124 may be doped in an n-type and the bottom portion layer 127 may be doped in a p-type. The first electrode 128 may be on the top portion clad 124 and the second electrode 129 may be on a peripheral region of the bottom portion layer 127, for applying a reverse voltage to the waveguide 125. The phase of the optical signal passing through the waveguide 125 may be changed by applying the reverse voltage. In some example embodiments, the applying of the reverse voltage may denote applying a higher voltage to an n-type doped layer than to a p-type doped layer. This may denote, for example, that when the top portion clad 124 is doped in the p-type and the bottom portion layer 127 is doped in the n-type, a higher voltage may be applied to the bottom portion layer 127 than to the top portion clad 124. If and/or when a voltage is applied to the waveguide 125, a carrier density of the waveguide 125 may be changed. A change in the carrier density may change a refractive index of the waveguide 125. If and/or when a length of a waveguide is constant, a phase change throughout the waveguide may increase as a refractive index thereof increases.

In FIGS. 5A and 5B, the first phase shifters 120a and 120b are illustrated as using a resistive heater or a PN diode structure. In some example embodiments, structures of the first phase shifters 120a and 120b are not limited thereto. According to some example embodiments, a phase shifter may be realized via a structure such as a PIN diode, a MOS transistor, or a SISCAP in the photonic IC 1000. According to some example embodiments, in the photonic IC 1000, a phase shifter may include other various structures in addition to structures described above based on the semiconductor substrate 1.

According to some example embodiments, in the photonic IC 1000, the first phase shifters 120a and 120b may be formed based on the semiconductor substrate 1. The first phase shifters 120a and 120b may attain enhanced reliability via a high heat-sink efficiency of the semiconductor substrate 1. Further, the structure of the first phase shifter 120 described above with reference to FIGS. 5A and 5B may also be applied to the second phase shifter 130 in FIG. 1A and the third phase shifter 190 in FIG. 1C which are described above.

Figure 6A:
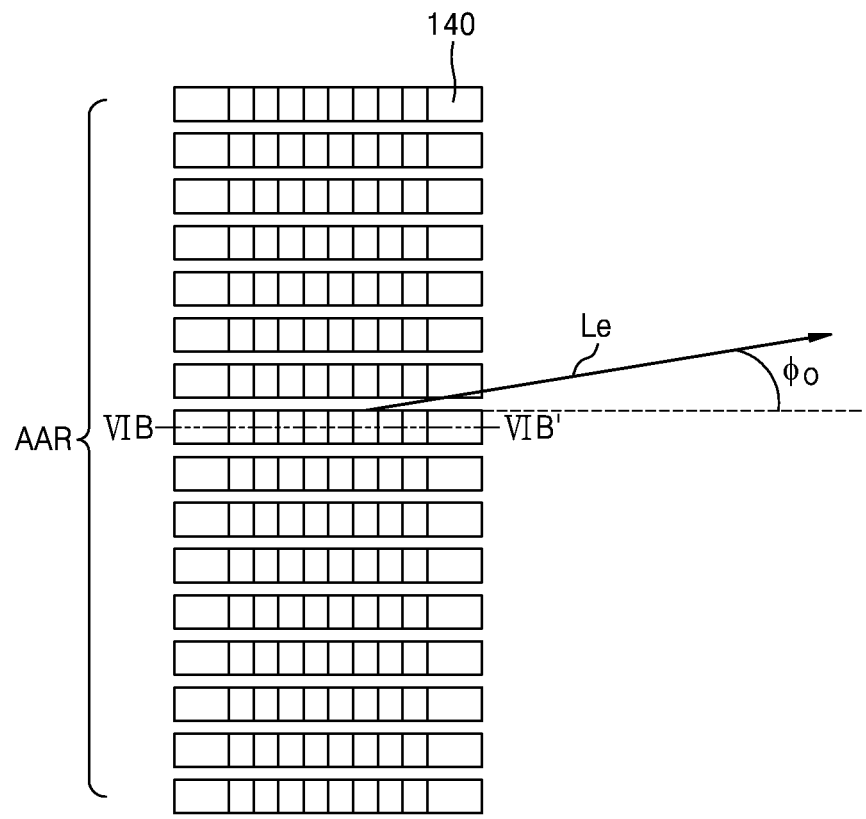
FIG. 6A and FIG. 6B are respectively a layout diagram and a cross-sectional view of an antenna included in a beam steering OPA, according to some example embodiments.
Figure 6B:
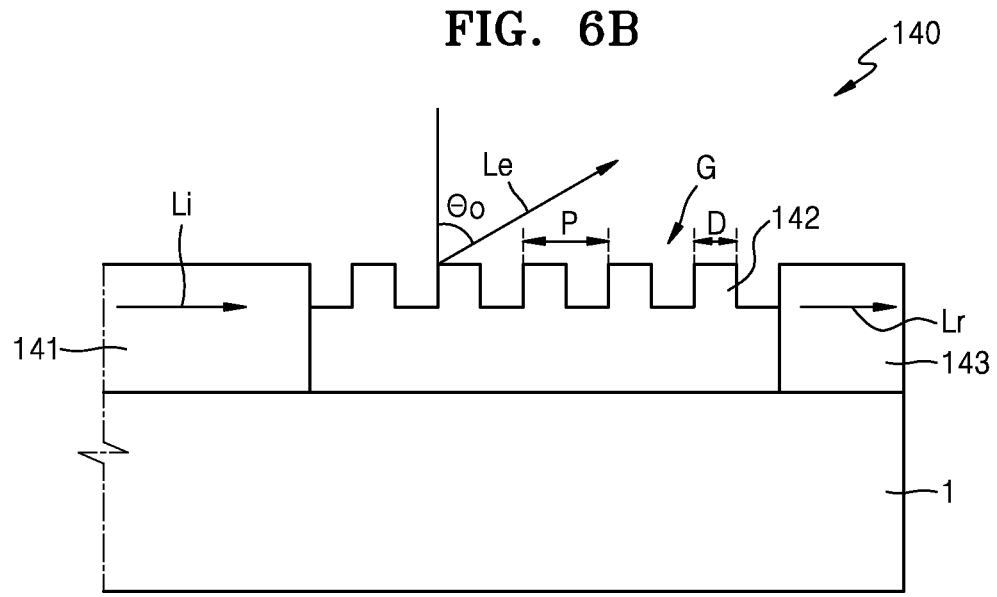

FIG. 6A is a layout diagram of an antenna 140 included in a beam steering OPA, according to some example embodiments. FIG. 6B is a cross-sectional view of the antenna 140, cut along the line VIB-VIB' of FIG. 6A.

Referring to FIGS. 6A and 6B, an antenna array AAR may have a structure in which unit antennas, each corresponding to the antenna 140 and having uniform distance therebetween and uniform sizes, are separate from each other and aligned on the semiconductor substrate 1.

The antenna 140 may include, formed on the semiconductor substrate 1, an incident layer 141, an antenna layer 142, and a remaining output terminal 143. A grid G may be on a top surface of the antenna layer 142. The incident layer 141, the antenna layer 142, and the remaining output terminal 143 may be formed based on the epitaxial layer 5 described above with reference to FIG. 3. That is, the incident layer 141, the antenna layer 142, and the remaining output terminal 143 may constitute an integrated continuous layer. However, the example embodiments are not limited thereto. The incident layer 141 and the remaining output terminal 143 may correspond to a waveguide arranged at a front end and a back end of the antenna layer 142. That is, the antenna layer 142 may be formed integrally with the waveguide in a single structure. The incident layer 141 and the remaining output terminal 143 may be formed in a structure in which the core Co. of the epitaxial layer 5 is surrounded by clads and combined with the antenna layer 142. Since an optical signal may proceed through the antenna layer 142, the antenna layer 142 may also correspond to the waveguide. Accordingly, the antenna 140 may have a structure in which the grid G is formed in the waveguide.

An incident optical signal Li may be incident on the antenna layer 142 from the core Co. and through the incident layer 141. The grid G periodically formed in the antenna layer 142 may cause a non-uniform refractive index distribution in the vicinity thereof. The incident optical signal Li may outwardly radiate in the form of a radiating wave Le due to the non-uniform refractive index distribution. The radiating wave Le may outwardly radiate at a first radiation angle Φo which is an azimuth of an upper surface of the semiconductor substrate 1 relative to a certain direction on the upper surface of the semiconductor substrate 1, and at a second radiation angle θo, which is a polar angle relative to a direction substantially perpendicular (e.g., perpendicular within manufacturing tolerances and/or material tolerances) to the top side of the semiconductor substrate 1. In some example embodiments, a remaining optical signal Lr, which remains without being radiated from the incident optical signal Li, may proceed through the remaining output terminal 143.

The first radiation angle Φo may be steered by adjusting relative phases of respective antennas 140 included in the antenna array AAR. The steering may be controlled by the first phase shifter 120 described in FIG. 1A. The second radiation angle θo may be controlled with respect to a wavelength of the optical signal input to the antenna 140. As described in FIG. 1A, the beam steering OPA 10a may include the light source 100 outputting optical signals in various wavelength bands of, for example, about 850 nm, about 905 nm, about 1060 nm, about 1310 nm, and about 1550 nm, and may also provide the second radiation angle θo so as to be appropriate for example embodiment characteristics and/or product characteristics.

A mode of the optical signal incident onto the antenna layer 142 may be selected by adjusting the refractive index of the antenna layer 142, a pitch P and a thickness D of the grid G, etc. For example, only an optical signal having the lowest basic mode from among the input optical signal Li may proceed through the antenna layer 142.

The structure of the antenna 140 may not be limited to those illustrated in FIGS. 6A and 6B. The antenna 140 may be formed based on the semiconductor substrate 1. Accordingly, the antenna 140 may be highly integrated at a low cost.

Figure 7A:
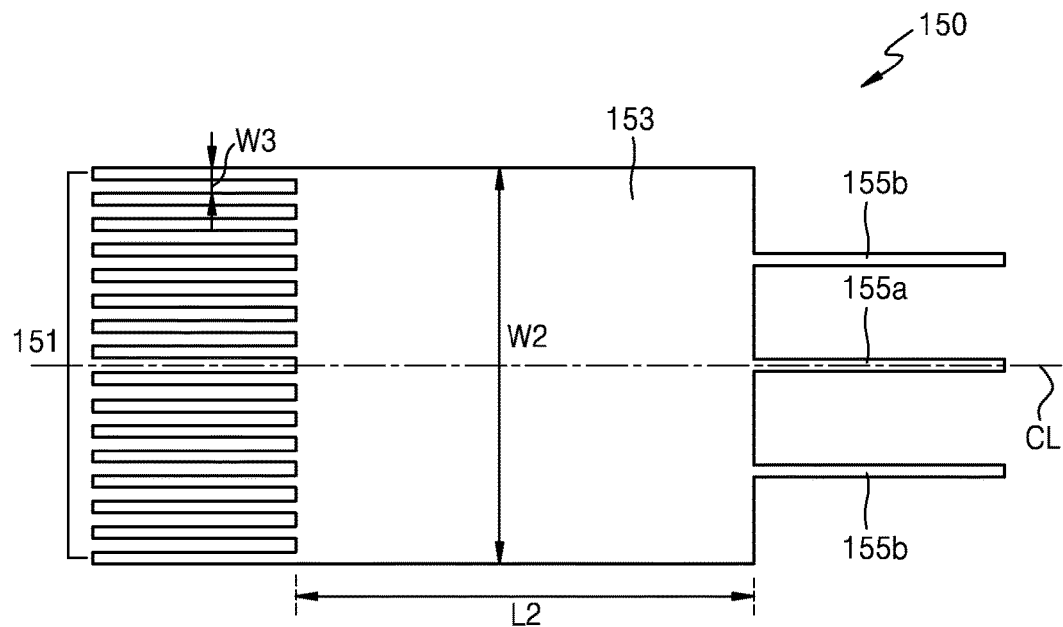
FIG. 7A, FIG. 7B, and FIG. 7C are layout diagrams of optical signal interferometers included in a beam steering OPA, according to some example embodiments.
Figure 7B:
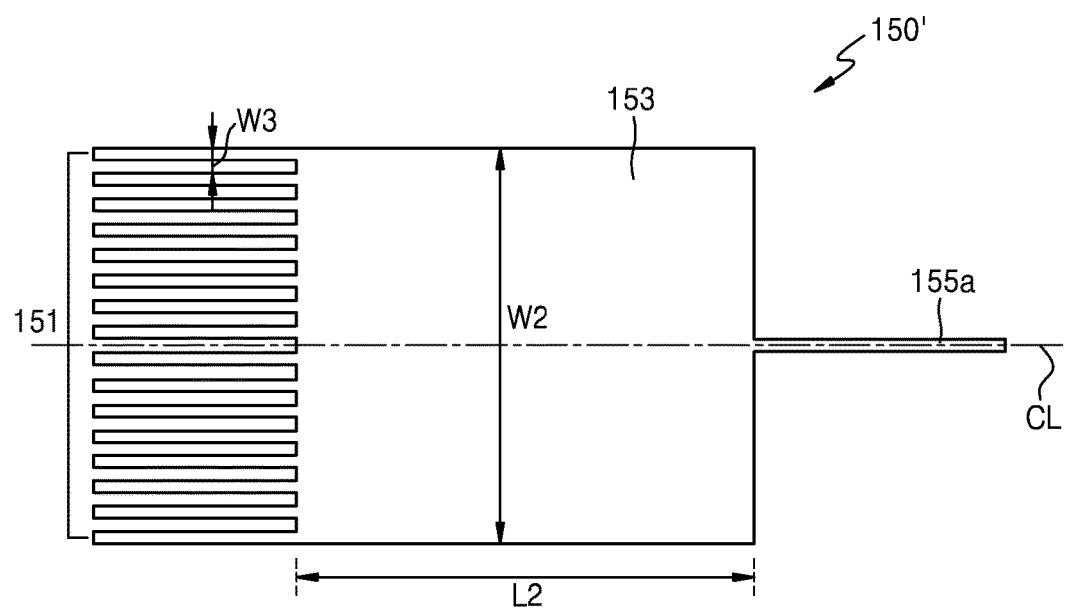
Figure 7C:
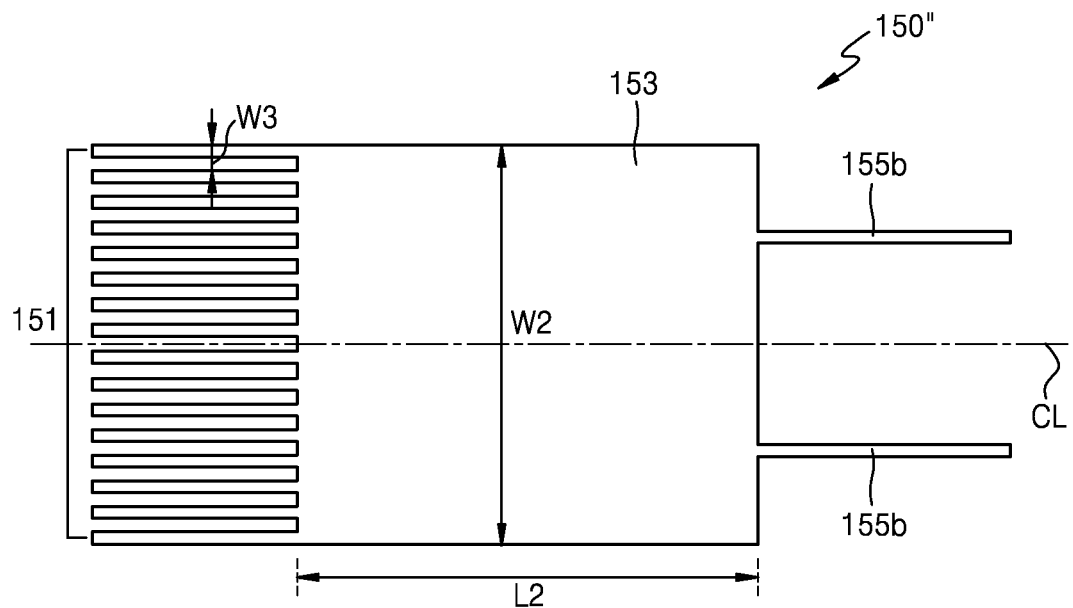

FIG. 7A, FIG. 7B, and FIG. 7C are layout diagrams of optical signal interferometers 150, 150', and 150" included in a beam steering OPA, respectively, according to some example embodiments.

Referring to FIG. 7A, the optical signal interferometer 150 may be a multi-mode interferometer. The optical signal interferometer 150 may include a plurality of first input waveguide regions 151, a multi-mode waveguide region 153, a first output waveguide region 155a, and a second output waveguide region 155b.

The first input waveguide regions 151, and the first and second output waveguide regions 155a and 155b may have linear shapes or roughly rectangular shapes in a certain direction. However, the example embodiments are not limited thereto. The first input waveguide regions 151, and the first and second output waveguide regions 155a and 155b may be substantially parallel (e.g., parallel within manufacturing tolerances and/or material tolerances) with each other. An optical signal may proceed in an extending direction of the first input waveguide regions 151, and of the first and second output waveguide regions 155a and 155b.

When an even number of first input waveguide regions 151 are included, the first input waveguide regions 151 may be separate from each other and arranged away from a centerline CL of the multi-mode waveguide region 153. However, the example embodiments are not limited thereto. If and/or when an odd number of first input waveguide regions 151 are included, one of the first input waveguide regions 151 may be arranged at the centerline CL of the multi-mode waveguide region 153.

The first output waveguide region 155a may be arranged along the centerline CL of the multi-mode waveguide region 153, and the second output waveguide region 155b may be separate from the centerline CL. Alternatively, the centerline CL may pass through the center of the first output waveguide region 155a. In some example embodiments, the centerline CL may denote a line which is parallel with a direction in which an optical signal physically proceeds in the first input waveguide regions 151 and passes through the center of the multi-mode waveguide region 153. The number of the second output waveguide regions 155b may be one or more. On the other hand, since the first output waveguide region 155a corresponds to the centerline CL, the number of the first output waveguide region 155a may be one.

The first input waveguide regions 151 may be connected to some or all of the antennas 140. In some example embodiments, the first input waveguide regions 151 may be connected to a limited portion (e.g., "limited selection") of the antennas 140. The first input waveguide regions 151 may act as waveguides through which optical signals received from the antennas 140 are transferred. The multi-mode waveguide region 153 may be a region in which the optical signals, having proceeded through the first input waveguide regions 151, interfere with each other and cause augmentation or offset interference. The first and second output waveguide regions 155a and 155b may act as waveguides through which the interfered optical signals are transmitted to respectively corresponding photoelectric converters 160.

The multi-mode waveguide region 153 may have a second length L2 in a direction in which an optical signal proceeds and a second width W2 in a direction substantially perpendicular (e.g., perpendicular within manufacturing tolerances and/or material tolerances) to the proceeding direction. A distance between centers of adjacent first input waveguide regions 151 may be a third width W3. Alternatively, a distance between corresponding points of adjacent first input waveguide regions 151 may be the third width W3. Otherwise, the multi-mode waveguide region 153 may be the same as the first multi-mode waveguide region 113a described above with reference to FIG. 4B.

Referring to FIG. 7B, unlike FIG. 7A, the optical signal interferometer 150' may include only the first output waveguide region 155a. Referring to FIG. 7C, unlike FIG. 7A, the optical signal interferometer 150" may include only the second output waveguide region 155b. Referring to FIGS. 7A through 7C, the optical signal interferometers 150, 150', and 150" are illustrated as multi-mode interferometers. However, the example embodiments are not limited thereto. For example, the optical signal interferometers 150, 150', and 150" may correspond to star couplers, etc. In addition, the optical signal interferometers 150, 150', and 150" are illustrated to include sixteen first input waveguide regions 151 in FIGS. 7A through 7C. However, the example embodiments are not limited thereto. Two to fifteen or more than seventeen first input waveguide regions 151 may be included.

Figure 8:
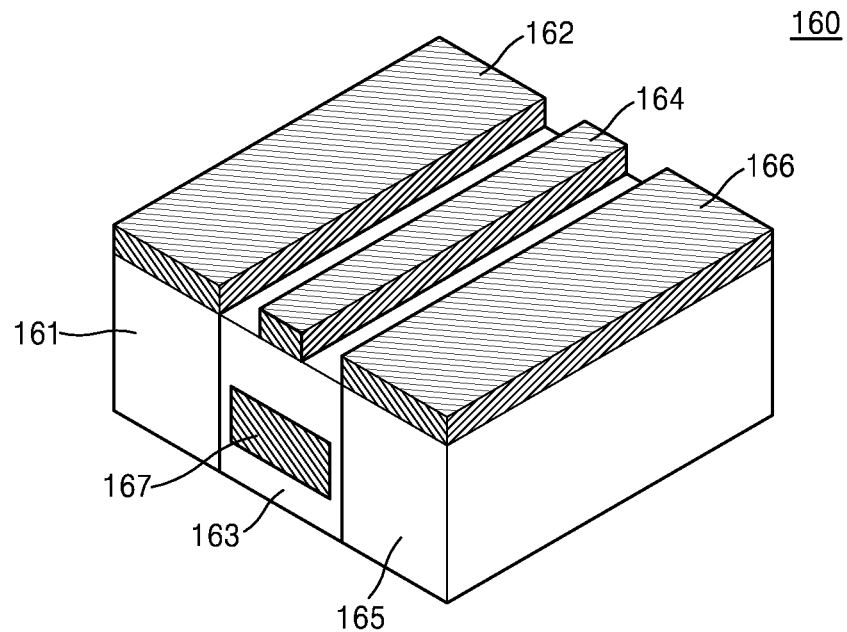
FIG. 8 is a perspective view of a photoelectric converter included in a beam steering OPA, according to some example embodiments.

FIG. 8 is a perspective view of a photoelectric converter 160 included in a beam steering OPA, according to some example embodiments.

Referring to FIG. 8, the photoelectric converter 160 may include a first conductive semiconductor layer 161, an intrinsic semiconductor layer 163, a second conductive semiconductor layer 165, a first electrode 162, a second electrode 164, and a third electrode 166. The first and second conductive semiconductor layers 161 and 165 may be separate from each other in a horizontal direction. The intrinsic semiconductor layer 163 may be between the first and second conductive semiconductor layers 161 and 165. The first and second conductive semiconductor layers 161 and 165 may be separate from each other with the intrinsic semiconductor layer 163 therebetween in the horizontal direction. The first through third electrodes 162, 164, and 166 may respectively sequentially correspond to the first conductive semiconductor layer 161, the intrinsic semiconductor layer 163, and the second conductive semiconductor layer 165. The first through third electrodes 162, 164, and 166 may be electrically connected to the first conductive semiconductor layer 161, the intrinsic semiconductor layer 163, and the second conductive semiconductor layer 165, respectively and sequentially.

According to some example embodiments, the photoelectric converter 160 may be a PIN photodiode. The first conductive semiconductor layer 161 may include a semiconductor doped with n-type impurities and the second conductive semiconductor layer 165 may include a semiconductor doped with p-type impurities, or vice versa. The intrinsic semiconductor layer 163 may be un-doped. Un-doped may denote that a semiconductor layer contains an intrinsic concentration of impurities because the semiconductor layer has not been subject to an impurity doping process.

A converter waveguide 167 may be formed in the intrinsic semiconductor layer 163 so that an optical signal may proceed along the intrinsic semiconductor layer 163. The converter waveguide 167 may be surrounded by the intrinsic semiconductor layer 163. The converter waveguide 167 may include a material having a higher circumferential refractive index relative to that of the intrinsic semiconductor layer 163.

Referring to FIG. 8, the photoelectric converter 160 is illustrated having a structure of horizontal beam irradiation in which an optical signal may enter horizontally. However, the example embodiments are not limited thereto. The photoelectric converter 160 may have a structure of vertical beam irradiation or a structure coupled with an optical fiber.

Figure 9A:
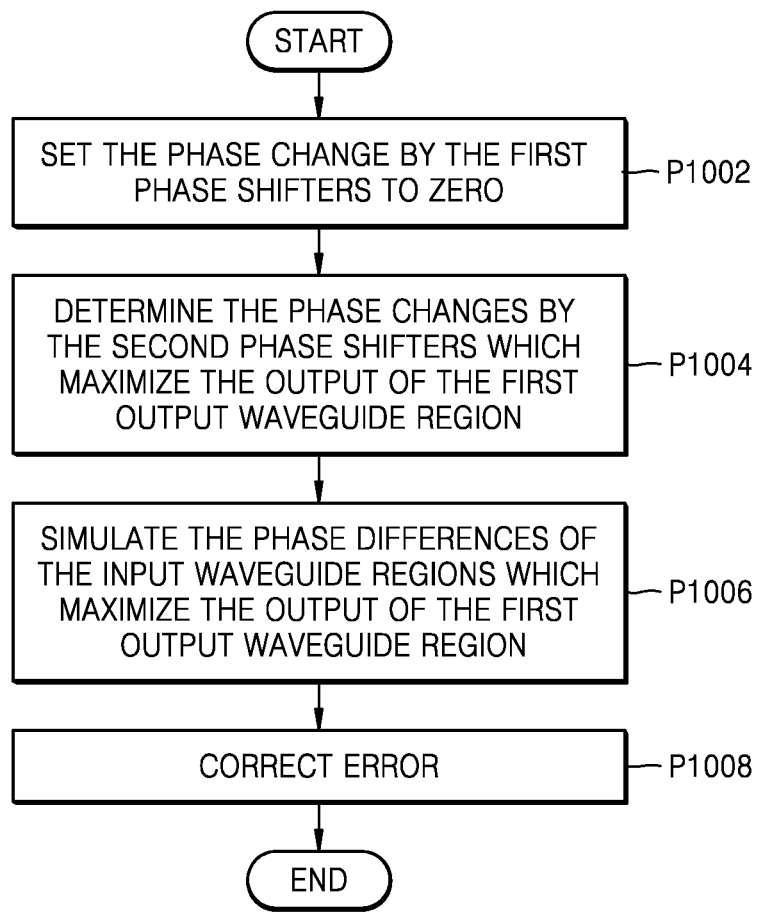
FIG. 9A, FIG. 9B, and FIG. 9C are flowcharts of methods of correcting errors due to process dispersion using a beam steering OPA, according to some example embodiments.
Figure 10A:
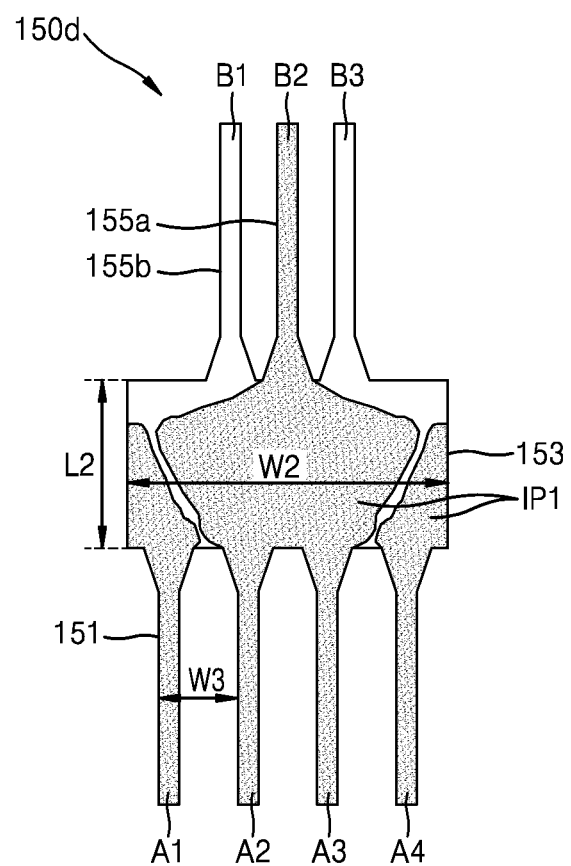
FIG. 10A, FIG. 11A, and FIG. 12A are plan views of optical signal interferometers for explaining methods of correcting errors due to the process dispersion using a beam steering OPA, according to some example embodiments.
Figure 10B:
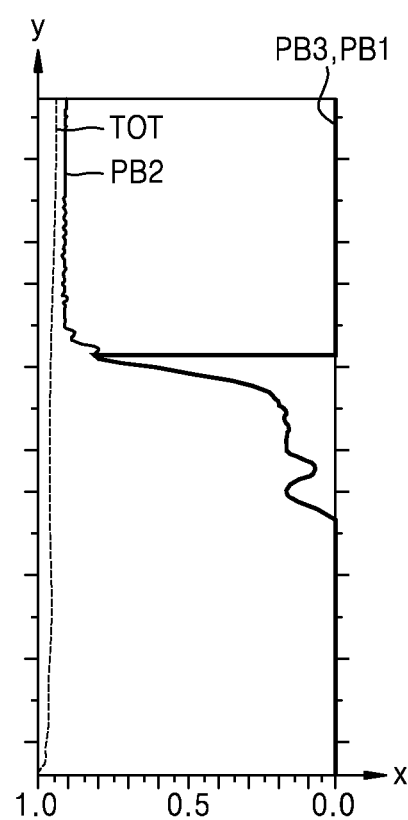
FIG. 10B, FIG. 11B, and FIG. 12B are graphs of simulation results with respect to magnitudes of optical signals in FIGS. 10A, 11A, and 12A, respectively.
Figure 11A:
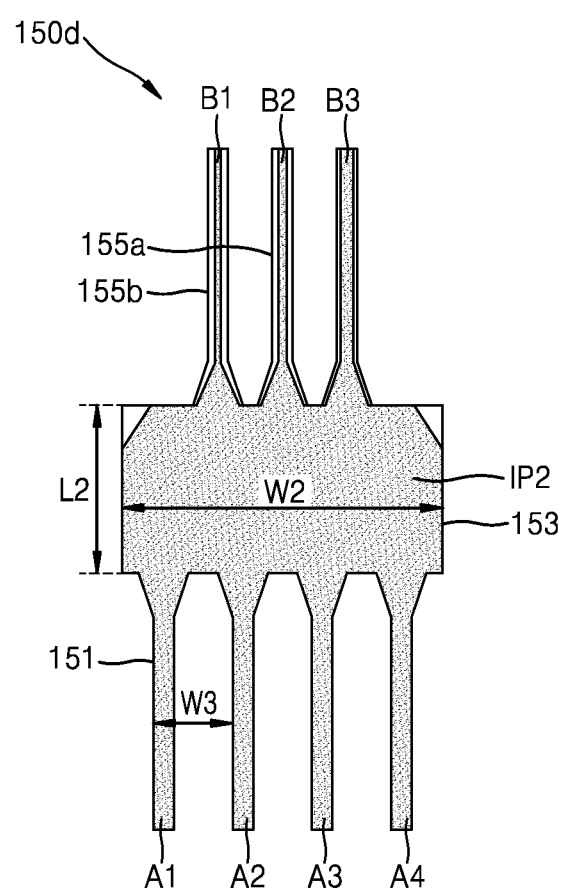
Figure 11B:
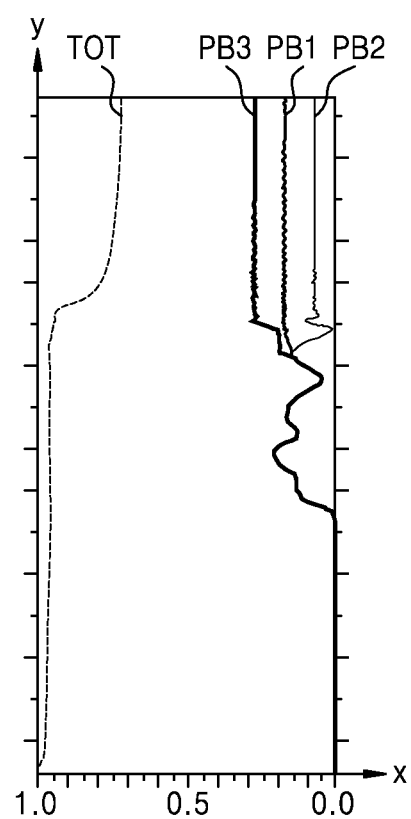
Figure 12A:
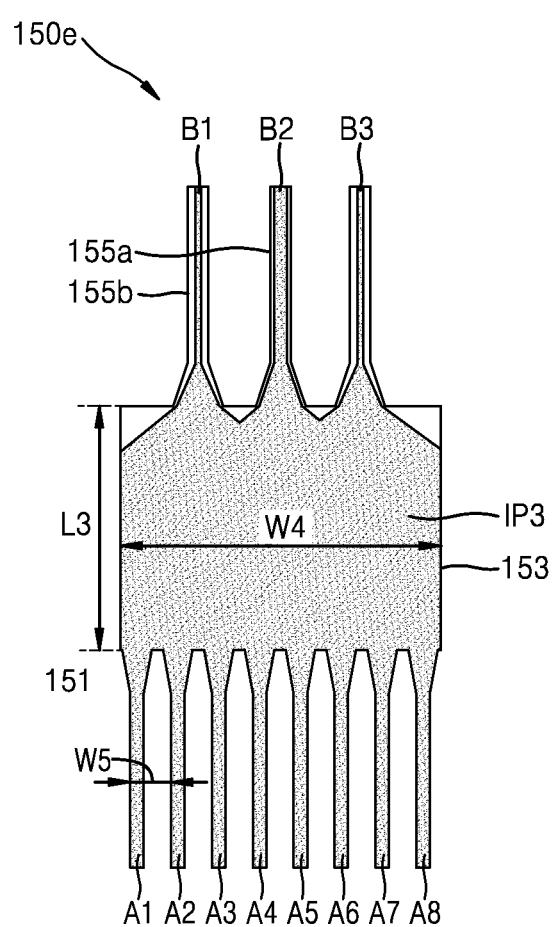
Figure 12B:
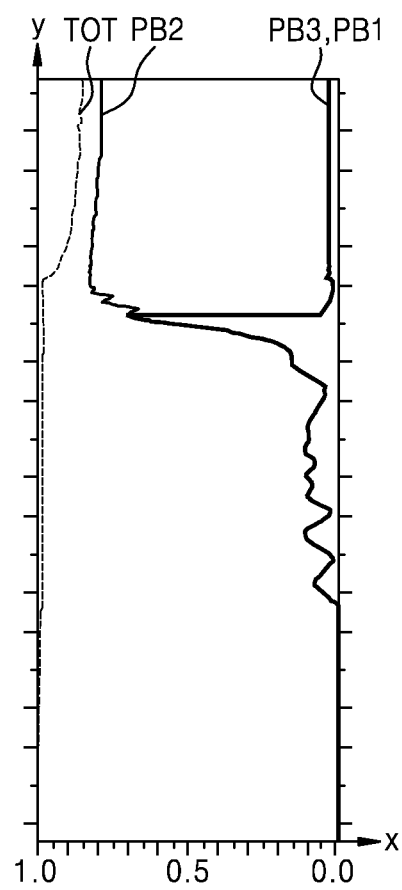

FIG. 9A is a flowchart of a method of correcting errors due to the process dispersion using a beam steering OPA, according to some example embodiments. FIG. 10A, FIG. 11A, and FIG. 12A are layout diagrams showing optical signal interference in optical signal interferometers 150d and 150e for explaining a method of correcting errors due to the process dispersion using a beam steering OPA, according to some example embodiments. FIG. 10B, FIG. 11B, and FIG. 12B are graphs of simulation results with respect to magnitudes of optical signals in FIG. 10A, FIG. 11A, and FIG. 12A, respectively. The optical signal interferometers 150d and 150e illustrated in FIG. 10A, FIG. 11A, and FIG. 12A may be substantially the same (e.g., the same within manufacturing tolerances and/or material tolerances) as the optical signal interferometer 150 illustrated in FIG. 7A, except in respect of the number of the input waveguides.

Referring to FIGS. 10A and 10B, first through fourth remaining optical signals A1 through A4 may be remaining optical signals that have been transferred from respective antennas (refer to 140 in FIG. 1A). Respective phases of the first through fourth optical signals A1 through A4 may be different from each other. However, the example embodiments are not limited thereto. The phases of the first through fourth optical signals A1 through A4 may be same.

A first interference pattern IP1 may be an optical signal resulting from interference among the first through fourth optical signals A1 through A4 in the multi-mode waveguide region 153. First and third optical signals B1 and B3 may be optical signals which have interfered with each other in the multi-mode waveguide region 153 and thereafter been output through the second output waveguide region 155b. A second output optical signal B2 may include optical signals which have interfered with each other in the multi-mode waveguide region 153 and thereafter been output through the first output waveguide region 155a. Widths of the first through fourth optical signals A1 through A4 and widths of the first through third optical signals B1 through B3 may correlate with magnitudes and quantities of respective optical signals. Widths of the first through fourth optical signals A1 through A4 and widths of the first through third optical signals B1 through B3 may be proportional to the magnitudes of respective optical signals.

In FIG. 10B, PB1, PB2, and PB3 may respectively denote output magnitudes of the first through third optical signals B1 through B3 after having been converted by one of the photoelectric converters 160 in FIG. 1A. TOT may denote total magnitude of the optical signals in a proceeding direction of the optical signals.

The optical signal interferometer 150d illustrated in FIG. 10A may be substantially the same (e.g., the same within manufacturing tolerances and/or material tolerances) as the optical signal interferometer 150 described with reference to FIG. 7A, except in respect of the number of the first input waveguide regions 151. Thus, the dimensions such as the second width W2, the third width W3, and the second length L2 will be used without separate explanations.

The first through third output optical signals B1 through B3 may be signals resulting from interference among the first through fourth remaining optical signals A1 through A4. Thus, depending on phase relations between the first through fourth remaining optical signals A1 through A4, the first through third output optical signals B1 through B3 having different magnitudes from each other may be output.

When the first through fourth remaining optical signals A1 through A4 have particular phase relations therebetween, a magnitude of the second output optical signal B2 may be the largest. If and/or when the first through fourth remaining optical signals A1 through A4 have particular phase relations therebetween, magnitudes of the first and third output optical signals B1 and B3 may be the smallest.

When the second width W2 is about 60.0 µm, the third width W3 is about 1.5 µm, and the second length L2 is about 19.7 µm, it may be assumed that an optical signal having a wavelength of about 1.31 µm is used. In some example embodiments, when phases of the second and third remaining optical signals A2 and A3 are the same, and the first through fourth remaining optical signals A1 through A4 have phases of about 90° lagging (or about 270° proceeding) with respect to the second and third remaining optical signals A2 and A3, the second output optical signal B2 may be increased and/or maximized. In some example embodiments, a magnitude of the second output optical signal B2 may be about $10^4$ times or greater than magnitudes of the first and third output optical signals B1 and B3. Dimension specifications described above are only examples and the example embodiments of the present inventive concepts are not limited thereto. In addition, phase relations between the first through fourth remaining optical signals A1 through A4 may be changed such that the second output optical signal B2 is increased and/or maximized depending on the wavelength of the optical signal, the second width W2, the third width W3, the second length L2, etc. In the graph of FIG. 10B, an x-axis denotes the magnitude of the optical signal and a y-axis denotes the proceeding direction of the optical signal. These definitions of the x- and y-axes may be equally applied to FIGS. 11B and 12B.

The optical signal interferometer 150d in FIGS. 11A and 11B is the same as the optical signal interferometer 150d in FIG. 10A, except that the phases of the first through fourth remaining optical signals A1 through A4 have arbitrary values. A second interference pattern IP2 may be an optical signal resulting from interference between the first through fourth remaining optical signals A1 through A4 in the multi-mode waveguide region 153.

When the phases of the first input waveguide regions 151 do not satisfy certain relations, the output optical signals may not be concentrated on the second output optical signal B2, but be spread to the first through third output optical signals B1 through B3. For example, when the first through fourth remaining optical signals A1 through A4 respectively have phases of about −130°, about 40°, about 0°, and about 120°, PB1, PB2, and PB3 may be respectively measured as about 0.173, about 0.0723, and about 0.271. This result is based on a case in which a total magnitude of the input optical signals is standardized as about 1.

FIGS. 12A and 12B illustrate a case in which the optical signal interferometer 150e includes eight first input waveguide regions 151. A third interference pattern IP3 may be an optical signal resulting from interference between first through eight remaining optical signals A1 through A8 in the multi-mode waveguide region 153. The multi-mode waveguide region 153 may have a third length L3 in the proceeding direction of the optical signal and a fourth width W4 in a direction substantially perpendicular (e.g., perpendicular within manufacturing tolerances and/or material tolerances) to the proceeding direction of the optical signal. In addition, a pitch between the first input waveguide regions 151 may correspond to a fifth width W5.

When the fourth width W4 is about 12.0 μm, the fifth width W5 is about 1.5 μm, and the second length L2 is about 38.3 μm, the second output optical signal B2 may be increased and/or maximized if the optical signal has a wavelength of about 1.31 μm, phases of the fourth and fifth remaining optical signals A4 and A5 are about 0°, as a reference phase, phases of the third and sixth remaining optical signals A3 and A6 are about −90°, phases of the second and seventh remaining optical signals A2 and A7 are about −180°, and phases of the first and eighth remaining optical signals A1 and A8 are −270°. In some example embodiments, the magnitudes of PB1, PB2, and PB3 may respectively be about 0.032, about 0.786, and about 0.032, and it is noted that the output optical signal has been concentrated onto the second output optical signal B2.

In summary, when phases of remaining optical signals are in particular relations, the optical output constituting the first through third output optical signals B1 through B3 may be concentrated on the second output optical signal B2, and the output of the first and third optical signals B1 and B3 may be very small. A method of correcting errors due to the process dispersion of a beam steering OPA will be described with reference to FIGS. 9A and 1A by using descriptions above with reference to FIGS. 10A through 12B. Hereafter, the method will be defined as a first correction method.

In operation P1002, no voltage (or current) may be applied to the first phase shifters 120. In other words, all phase shifts for steering the radiation pattern may be set to zero. In FIG. 1A, the phase shifts of the first phase shifters 120 from the uppermost position to the bottom position may be respectively defined as $\theta 1$, $\theta 2$, $\theta 3$, ..., and $\theta 16$, sequentially. Then, a setting may be executed so that $\theta 1$, $\theta 2$, $\theta 3$, ..., and $\theta 16$ are equal to about 0. This notation is only for the sake of convenience and will not limit the scope of the present inventive concepts. A driving voltage or current of respective first phase shifters 120 may be set so that the phase shift does not occur by respective first phase shifters 120.

In operation P1004, a voltage-phase shift driving condition and/or a current-phase shift driving condition of the second phase shifters 130 may be measured so that the phase shifts by the second phase shifters 130 are in a range of about 0 to about $2\pi$. In general, since the second phase shifters 130 included in a beam steering OPA may have different phase shift efficiencies from each other, the voltage-phase shift driving condition and/or the current-phase shift driving condition with respect to each of the second phase shifters 130 may be measured. The measured voltage-phase shift driving condition and/or current-phase shift driving condition may be stored in a certain memory device. In some example embodiments, the voltage-phase shift driving condition and/or the current-phase shift driving condition of the first phase shifters 120 may also be measured.

Referring to FIGS. 1A, 7A, and 9A, a phase shift value of the second phase shifters 130 may be measured when the output of the first output waveguide region 155a of the optical signal interferometer 150 is increased and/or maximized. The phase shifts of the second phase shifters 130 from the uppermost position to the bottom position are generated by the second phase shifters 130 at a time when the output of the first output waveguide region 155a is increased and/or maximized, and may be respectively defined as $\Delta\theta 1$, $\Delta\theta 2$, $\Delta\theta 3$, ..., and $\Delta\theta 16$, sequentially. In some example embodiments, phase shift values generated by the second phase shifters 130 may be measured when the output of the second output waveguide region 155b is reduced and/or minimized.

Methods for finding $\Delta\theta 1$, $\Delta\theta 2$, $\Delta\theta 3$, ..., and $\Delta\theta 16$, when the output of the first output waveguide region 155a is increased and/or maximized, may include brute force, hill climbing, an iterated local search, simulated annealing, etc.

The brute force may denote an optimization method of substituting all possible values to obtain a particular result. Each of the phase shifts generated by the second phase shifters 130 may include a range of about 0 to about $2\pi$. The range of about 0 to about $2\pi$ for each of the second phase shifters 130 may be equally divided into a certain number K (K is an integer) of values. Then, all possible combinations of the phase shifts may be applied for selecting a combination at which the first output waveguide region 155a outputs the largest signal. Discrete values of 0, $(1/K)2\pi$, $(2/K)2\pi$, ..., and $((K-1)/K)2\pi$ for respective second phase shifters 130 may be substituted. If and/or when the beam steering OPA 10a includes sixteen channels as illustrated in FIG. 1A, the output of the first output waveguide region 155a may be measured up to $K^{16}$ times. If and/or when this concept is generalized for a beam steering OPA including N channels, the output of the first output waveguide region 155a may be measured up to $K^N$ times. If and/or when a value of K is set as sufficiently large, optimum values of $\Delta\theta 1$, $\Delta\theta 2$, $\Delta\theta 3$, ..., and $\Delta\theta 16$ having a high accuracy may be searched. In some example embodiments, a problem may occur that the duration associated with the above process may be relatively large depending on values of K and N.

The hill climbing may denote an optimization method in which one value is selected at a time, a result thereof is identified, and whether a changed value is to be maintained is determined. An arbitrary phase shift may be set for each of the second phase shifters 130, a phase shift generated by any one among the second phase shifters 130 may be increased or decreased by a certain angle, and the output of the first output waveguide region 155a of the optical signal interferometer 150 may be measured. If and/or when the output of the first output waveguide region 155a increases, the phase shift values generated by the second phase shifters 130, of which the phase shift is increased or decreased, may be maintained. If and/or when the output of the first output waveguide region 155a decreases, the phase shift values generated by the second phase shifters 130, of which the phase shift is increased or decreased, may be returned to original values before being increased or decreased. In some example embodiments, a measurement speed may be fast, but a convergence problem at local maxima, not at a global value, may occur.

The iterated local search may be a method for solving a problem whereby local search methods such as the hill climbing converge at local maxima or local minima. The iterated local search may be a method of searching for a series of locally optimal solutions by applying perturbation to a current locally optimal solution so that the current locally optimal solution moves to a region of another locally optimal solution. In some example embodiments, intensity of perturbation may be large enough so that the current locally optimal solution can move from a region corresponding to the current locally optimal solution to the region corresponding to the other locally optimal solution.

The simulated annealing may be an algorithm for executing a global optimization which simulates a process of a material at a high temperature slowly being cooled and stabilized, that is, annealed. The simulated annealing may be a method for solving a problem whereby local search methods such as the hill climbing converge at local maxima or local minima. The simulated annealing may determine whether to move to the other optimal solution or to maintain the current optimal solution by statistically comparing the current optimal solution and the other optimal solution which has been randomly generated. In some example embodiments, a probability of moving to the other optimal solution may depend on a temperature in a physical process. In other words, when the temperature is high, a probability of selecting the randomly generated optimal solution may be high, even if energy of the randomly generated optimal solution is greater than that of the current optimal solution. In this way, a tool may be provided so that a solution can escape from the local maxima and the local minima at a high temperature. In some example embodiments, when a temperature parameter reaches a low value as the optimization proceeds, the probability of selecting a solution having high energy decreases and a gradual convergence may be achieved.

Phase differences between the first input waveguide regions 151a for increasing and/or maximizing the output of the first output waveguide region 155a with respect to a certain optical signal interferometer 150 may be defined as $\alpha 1, \alpha 2, \alpha 3, \ldots,$ and $\alpha 16$. The phase differences between the first input waveguide regions 151a may be determined via a simulation. If and/or when a 4:1 multi-mode interferometer satisfies a particular value condition, $\alpha 1$ and $\alpha 4$ are about $-90°$, and $\alpha 2$ and $\alpha 3$ are about $0°$. If and/or when a 8:1 multi-mode interferometer satisfies a particular value condition, $\alpha 1$ and $\alpha 8$ are about $-270°$, $\alpha 2$ and $\alpha 7$ are about $-180°$, $\alpha 3$ and $\alpha 6$ are about $-90°$, and 60 4 and $\alpha 5$ are about $0°$.

Accordingly, $\Delta \theta 1, \Delta \theta 2, \Delta \theta 3, \ldots,$ and $\Delta \theta 16$ may be values including the process dispersion in phase shifts corresponding to maximum values, and $\alpha 1, \alpha 2, \ldots,$ and $\alpha 16$ may be phase shift values corresponding to the maximum values. Thus, errors due to the process dispersion of respective channels may be corrected by sequentially setting respective phase shifts generated by the second phase shifters 130 as $\Delta \theta 1$-$\alpha 1, \ldots,$ and $\Delta \theta 16$-$\alpha 16$. In some example embodiments, when phase shifts generated by the second phase shifters 130 are set as $\Delta \theta 1$-$\alpha 1$-$(\Delta \theta k$-$\alpha k)$, $\Delta \theta 2$-$\alpha 2$-$(\Delta \theta k$-$\alpha k), \ldots, \Delta \theta k$-$\alpha k$-$(\Delta \theta k$-$\alpha k), \ldots,$ and $\Delta \theta 16$-$\alpha 16$-$(\Delta \theta k$-$\alpha k)$ based on $\Delta \theta k$-$\alpha k$ which is a certain $k^{th}$ phase shift (where k is an integer satisfying $1 \le k \le 16$), a $k^{th}$ second phase shifter 130 may be omitted and correction of errors due to the process dispersion may be possible by using fifteen second phase shifters 130. If and/or when a value of $\Delta \theta k$-$\alpha k$ satisfying a certain condition is selected as a base, power consumption of the second phase shifters 130 may be reduced. The power consumption may be reduced when $\Delta \theta k$-$\alpha k$ is selected, wherein $\Delta \theta k$-$\alpha k$ is close to any one of a median, an average value, and a root mean square of $\Delta \theta 1$-$\alpha 1, \Delta \theta 2$-$\alpha 2, \ldots,$ and $\Delta \theta 16$-$\alpha 16$.

The first correction method described above uses the multi-mode interferometer. However, the example embodiments are not limited thereto, and the star coupler, etc. may also be used. A third correction method to be described later may use the directional coupler and the Y-branch coupler.

Process errors of a beam steering OPA have been conventionally corrected by measuring the radiation pattern of the beam steering OPA with an outside camera. Correction has been executed by measuring the radiation pattern of the beam steering OPA until the radiation pattern of the beam steering OPA is close to a Gaussian distribution. In some example embodiments, depending on wavelengths to be used, expensive outside camera equipment may be utilized and a problem of continuously aligning the outside camera due to thermal perturbation, etc. may occur. Then, a cost of composing a correction system and time associated with correction may increase, and a cost of related products may increase.

According to some example embodiments, separate equipment for correcting the phase errors due to the process dispersion may not be utilized, and errors due to the process dispersion may be adequately corrected by using electrical signals, etc. output from the inside of the photonic IC 1000. As a result, the photonic IC 1000 may have enhanced reliability, reduced cost, or the like. Sensor data generated by the photonic IC 1000 may have improved accuracy as a result.

Figure 9B:
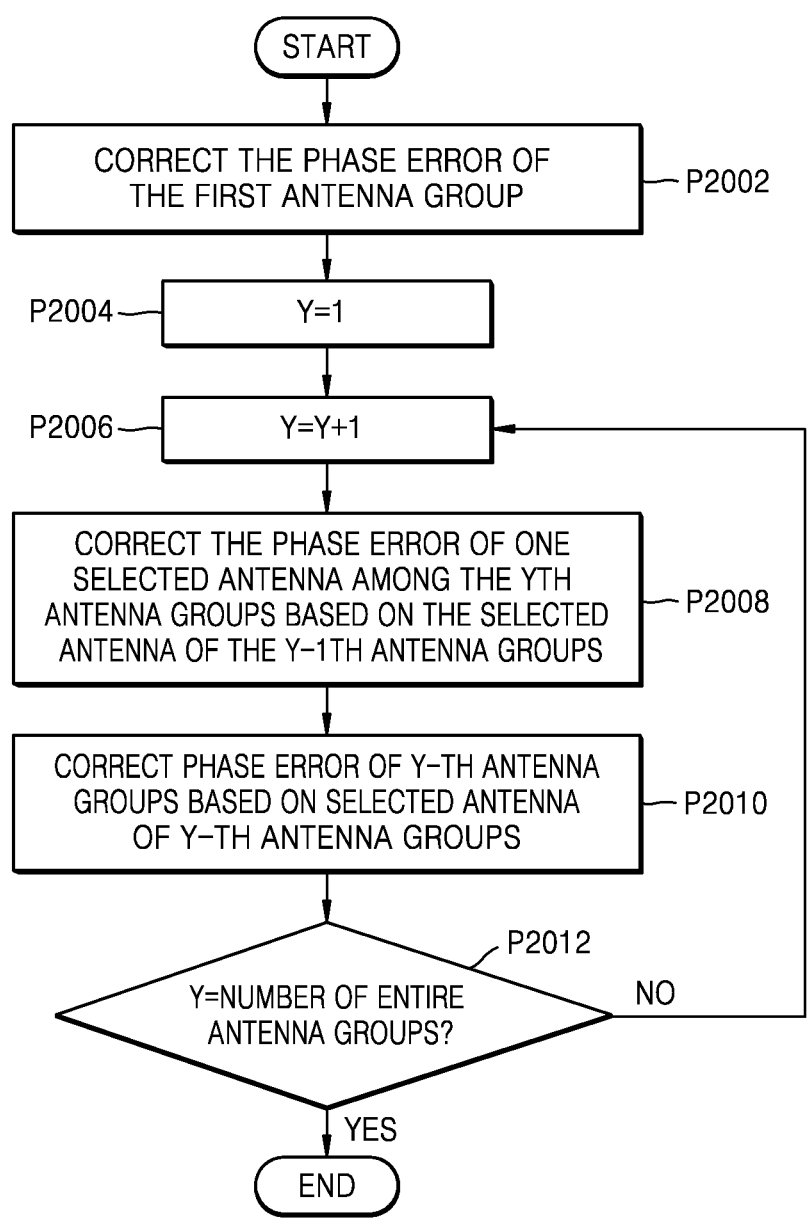

FIG. 9B is a flowchart of a method of correcting phase errors due to the process dispersion by using a beam steering OPA (10c of FIG. 1C), according to some example embodiments.

Referring to FIGS. 1C and 9B, a method of correcting errors due to the process dispersion of the beam steering OPA 10c will be described. Hereinafter, the method will be defined as a second correction method. Descriptions of content overlapping with content in the first correction method will be omitted and only differences will be mainly described.

In operation P2002, errors due to the process dispersion between antennas 140_1, 140_2, 140_3, and 140_4 included in the first antenna group AG1 may be corrected by a method which is substantially the same (e.g., the same within manufacturing tolerances and/or material tolerances) as the first correction method.

In operation P 2004, a parameter Y may be defined and an initial value thereof may be set as 1. The parameter Y may be used to select any one of the first through third antenna groups AG1 through AG3.

Next, in operation P2006, the parameter Y may be redefined by the formula Y=Y+1. Then, a current value of Y may be 2. Via the parameter Y, the phase errors due to the process dispersion may be sequentially corrected and thereafter, a termination point of iteration may be determined.

Next, in operation P2008, phase errors between any antenna selected from the antennas 140 included in the $(Y-1)^{th}$ antenna group AGY-1 and any antenna selected from the antennas 140 included in the $Y^{th}$ antenna group AGY may be corrected. In other words, the phase errors between any antenna selected from the antennas 140 included in the first antenna group AG1 and any antenna selected from the antennas 140 included in the second antenna group AG2 may be corrected. In this manner, the phase error correction value for any one antenna of the antennas 140 selected from the second antenna group AG2 may be determined. In some example embodiments, an antenna selected from the first antenna group AG1 may correspond to the fourth antenna 140_4 which is closest to the second antenna group AG2. However, the example embodiments are not limited thereto. In some example embodiments, an antenna selected from the second antenna group AG2 may correspond to the fifth antenna 140_5 which is closest to the first antenna group AG1. However, the example embodiments are not limited thereto.

Unlike the operation above, when errors are individually corrected for the first through third antenna groups A1 through A3, the phase errors between the first through third antenna groups A1 through A3 may occur.

In some example embodiments, the phase error for the fifth antenna 140_5 may be corrected based on the phase of the fourth antenna 140_4. In other words, the phase error for the fifth antenna 140_5 selected from the second antenna group AG2 may be corrected, while phase correction of the second phase shifter 130 corresponding to the fourth antenna 140_4 selected from the first antenna group AG1 is not executed.

Next, in operation P2010, phase errors for other antennas 140_6, . . . , and 140_12 of the second antenna group AG2 may be corrected based on the fifth antenna 140_5. In other words, the phase errors of other antennas 140_6, . . . , and 140_12 of the second antenna group AG2 may be corrected, while the phase correction of the second phase shifter 130 corresponding to the fifth antenna 140_5 is not executed.

Then, in operation P2012, whether a value of the parameter Y is the same as the number of total antenna groups may be determined. The operation P2012 may be a step for determining whether phase error correction for all channels included in the beam steering OPA 10c has been complete. For example, there are three, that is, the first through third antenna groups AG1 through A3 in FIG. 1C. Thus, when the value of the parameter Y is 3, the phase correction may be complete, but when the value of the parameter Y is less than 3, a process may return to operation P2006.

Next, in operation P2006, the parameter Y may be redefined by the formula Y=Y+1. In some example embodiments, the value of the parameter Y may be 3.

Next, in operation P2008, the phase errors between any antenna selected from the antennas 140_5, . . . , and 140_12 included in the second antenna group AG2 and any antenna selected from the antennas 140_13, . . . , and 140_16 included in the third antenna group AG3 may be corrected. In this manner, the phase error correction value for any one of the antennas 140 selected from the third antenna group AG3 may be determined. An antenna 140 selected from the second antenna group AG2 may correspond to the twelfth antenna 140_12 which is closest to the third antenna group AG3. However, the example embodiments are not limited thereto. An antenna 140 selected from the third antenna group AG3 may correspond to the thirteenth antenna 140_13 which is closest to the second antenna group AG2. However, the example embodiments are not limited thereto.

Next, in operation P2010, the phase errors for other antennas 140_14, . . . , and 140_16 of the third antenna group AG3 may be corrected based on the thirteenth antenna 140_13. In other words, the phase errors of other antennas 140_14, . . . , and 140_16 of the third antenna group AG3 may be corrected, while the phase correction of the second phase shifter 130 corresponding to the thirteenth antenna 140_13 is not executed.

Next, in operation P2012, since the value of the parameter Y is the same as the total number of the antenna groups, the phase correction may be ended.

Referring to FIGS. 1C and 9B, the phase error correction is described in a sequence from the first to third antenna groups AG1 to AG3. In some example embodiments, it may not matter even if the phase error of the second antenna group AG2 is firstly corrected or that of the third antenna group AG3 is firstly corrected.

The optical signals corresponding to the remaining output terminals of the fourth, fifth, twelfth, and thirteenth antennas 140_4, 140_5, 140_12, and 140_13 may be branched one more time than the other antennas 140_1, 140_2, 140_3, 140_6, 140_7, 140_8, 140_9, 140_10, 140_11, 140_14, 140_15, and 140_16, and thus, magnitudes thereof may be approximately about ½ of those of the other antennas 140. In some example embodiments, since the correction methods of the phase errors due to the process dispersion described with reference to FIGS. A1 and 9B use phase differences between the optical signals of the antennas, it may not matter even if the optical signals having different magnitudes from each other are input to the first and second optical signal interferometers 150a and 150b.

Figure 9C:
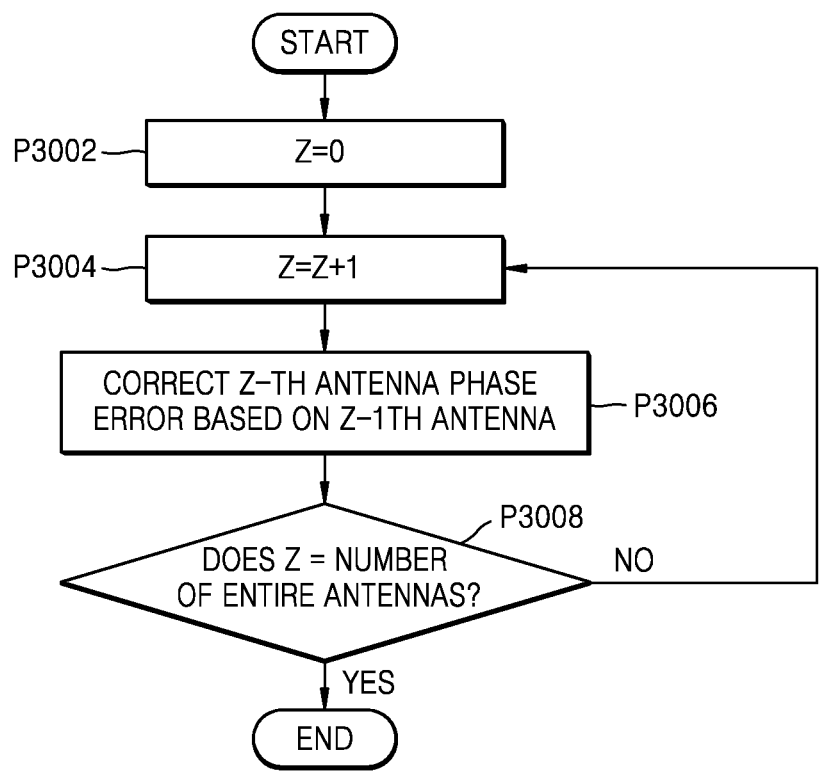

FIG. 9C is a flowchart of a method of correcting phase errors due to the process dispersion by using a beam steering OPA (10d of FIG. 1D), according to some example embodiments.

Referring to FIGS. 9C and 1D, a method of correcting errors due to the process dispersion of the beam steering OPA 10d will be described. Hereinafter, the method will be defined as a third correction method. Descriptions of content overlapping with content in the first and second correction methods will be omitted and only differences will be mainly described.

In operation P3002, a parameter Z may be defined and an initial value thereof may be set as 0. The parameter Z may be used to select any one of the first through sixteenth antennas 140_1, . . . , and 140_16 that may be used for phase correction thereof.

Next, in operation P3004, the parameter Z may be redefined by the formula Z=Z+1. Via the parameter Z, the phase errors due to the process dispersion may be sequentially corrected, and thereafter a termination point of iteration may be determined. A current value of Z may be 2.

In operation P3006, the phase error between the first and second antennas 140_1 and 140_2 may be corrected by using a method substantially the same (e.g., the same within manufacturing tolerances and/or material tolerances) as the first correction method. In other words, the phase error correction value for the first and second antennas 140_1 and 140_2 may be determined so that output magnitude of the first output waveguide region 155 of the third optical signal interferometer 160c corresponding to first and second antennas 140_1 and 140_2 is increased and/or maximized. In some example embodiments, the phase shift value of the second phase shifter 130 corresponding to the second antenna 140_2 may be determined without changing the phase of the first antenna 140_1, based on the phase of the first antenna 140_1.

Then, in operation P3008, whether a value of the parameter Z is the same as the total number of antenna groups may be determined. The operation P3008 may be a step for determining whether the phase error correction for all channels included in the beam steering OPA 10d has been completed. For example, when the value of the parameter Z is 16, the phase correction may be completed, but when the value of the parameter Z is less than 16, a process may return to operation P3004.

When the phase correction is repeated for fifteen times according to sequences in FIG. 9C, the phase correction due to the process dispersion for all channels may be complete.

A method of determining the phase error correction values of the first antenna 140_1 to the sixteenth antenna 140_16 in sequence has been described. In some example embodiments, any other arbitrary antenna may be selected as a base and the phase error correction values of remaining antennas may be determined. For example, it may be possible that the fourth antenna is selected as a base, the phase error correction values of the third and fifth antennas 140_3 and 140_5 are determined, and thereafter, correction for the second and sixth antennas 140_2 and 140_6 is executed. Further, a method of correcting the phase error by measuring interference between remaining optical signals of adjacent antennas 140 has been described. In some example embodiments, the phase error may be corrected by measuring interference of the remaining optical signals between the antennas 140 that are not adjacent to each other.

Correction sequences in the first through third correction methods described above are only examples and embodiments of the present inventive concepts are not limited thereto. Below, the first through third correction methods described above will be mutually compared with each other. For example, three cases of a beam steering OPA having a total of N channels will be described; i) a beam steering OPA including one optical signal interferometer including N first input waveguide regions, ii) a beam steering OPA including M (where N=K*M) optical signal interferometers including K first input waveguide regions, and iii) a beam steering OPA including (N−1) optical signal interferometers including two first input waveguide regions.

In the case of i), when a range of about 0 to about $2\pi$ is equally divided by 1 values, a random substitution method is used, and the phase error correction value is determined for each channel, one phase correction value may be substituted for each of N channels. If and/or when phases are corrected while the phase of any one of the channels is fixed, a total of $1^{N-1}$ times of measurements may be performed. In the case of ii), the method may correspond to antenna groups including N antennas for each optical signal interferometer. Since the phase of any one antenna among antennas of each antenna group can be a base value, $M*1^{K-1}$ times of measurements for each antenna group may be performed. Thereafter, for correcting differences between two antenna groups different from each other, any one antenna may be selected for an antenna group, and the phase error values between two selected antennas may be corrected. Accordingly, an additional $(M-1)*1^2$ times of measurements may be performed. Thus, a total of $M*1^{K-1}+(M-1)*1^2$ times of measurements may be performed. In the case of iii), two antennas may be sequentially selected for the phase correction and a maximum of $(N-1)*1^2$ times of measurements may be performed. As an example, when N=16, K=4, M=4, and l=10, the first correction method may include $10^{15}$ measurements, the second correction method may include 4,300 measurements, and the third correction method may include 1,500 measurements.

The first correction method may include simple wirings, may include one first output waveguide region (refer to 155a in FIG. 7B) and one photodiode, and may be advantageous for obtaining a process margin. The third correction method may include a minimum of fifteen diodes, and in particular, a design of the beam steering OPA may be limited due to electrodes connected to the diodes. In addition, a configuration of the beam steering OPA may be complex due to branch structures arranged at the remaining output terminals of the antennas.

According to descriptions above, correction of errors due to the process dispersion of a beam steering OPA may be correction of phase errors due to the process dispersion that can be generated ahead of antennas. In some example embodiments, the correction may include phase errors due to the process dispersion that may be generated in optical signal interferometers. Accordingly, lengths of waveguide regions (that is, first input waveguide regions, and first and second output waveguide regions) included in optical signal interferometers, and multi-mode waveguide regions, may be reduced. Thus, the phase errors of the beam steering OPA phase may be adequately corrected.

While the inventive concepts has been particularly shown and described with reference to embodiments thereof, it will be understood that various changes in form and details may be made therein without departing from the spirit and scope of the following claims.

What is claimed is:

1. A beam steering optical phased array (beam steering OPA), comprising:
    an optical signal distributor, the optical signal distributor including a plurality of output terminals, the optical signal distributor configured to divide and output a plurality of optical signals through separate, respective output terminals of the plurality of output terminals;
    a plurality of phase shifters coupled to separate, respective output terminals of the plurality of output terminals, the plurality of phase shifters configured to receive separate, respective optical signals of the plurality of optical signals and shift phases thereof to generate a plurality of phase-shifted optical signals;
    a plurality of antennas configured to receive, from the plurality of phase shifters, the plurality of phase-shifted optical signals; and
    an optical signal interferometer, the optical signal interferometer including
        a plurality of first input waveguide regions connected to a limited selection of the plurality of antennas and extending in a first direction,
        a multi-mode waveguide region connected to the plurality of first input waveguide regions, and
        a first output waveguide region connected to the multi-mode waveguide region and extending in the first direction.

2. The beam steering OPA of claim 1, wherein the first output waveguide region is configured to correspond to a centerline of the plurality of first input waveguide regions in the first direction.

3. The beam steering OPA of claim 2, further comprising:
    a plurality of first photoelectric converters connected to the first output waveguide region.

4. The beam steering OPA of claim 3, wherein the optical signal interferometer includes a second output waveguide region separate from the first output waveguide region, and a second photoelectric converter connected to the second output waveguide region.

5. The beam steering OPA of claim 1, wherein the first output waveguide region is configured to correspond to a centerline of the multi-mode waveguide region in the first direction.

6. The beam steering OPA of claim 1, wherein adjacent first input waveguide regions among the plurality of first input waveguide regions are equidistantly separate from each other.

7. The beam steering OPA of claim 1, wherein,
the plurality of antennas include separate, respective output terminals of a plurality of remaining output terminals, and
the plurality of first input waveguide regions are connected to separate, respective output terminals of the plurality of remaining output terminals.

8. The beam steering OPA of claim 1, wherein the plurality of phase shifters are configured to
change phases of the plurality of optical signals so that the plurality of phase-shifted optical signals have different phases from each other, and
correct phase errors of the plurality of phase-shifted optical signals.

9. The beam steering OPA of claim 1, wherein the plurality of phase shifters include
a plurality of first phase shifters configured to change phases of the plurality of optical signals to generate the plurality of phase-shifted optical signals that have different phases from each other, and
a plurality of second phase shifters configured to correct errors of the plurality of phase-shifted optical signals.

10. The beam steering OPA of claim 1, wherein the optical signal interferometer is a many-to-one multi-mode interferometer.

11. The beam steering OPA of claim 1, further comprising:
a plurality of optical signal branching elements between at least a portion of antennas of the plurality of antennas and the optical signal interferometer, the plurality of optical signal branching elements configured to divide optical signals received from the portion of antennas into a plurality of divided optical signals and output the plurality of divided optical signals.

12. A beam steering optical phased array (beam steering OPA), comprising:
an optical signal distributor, the optical signal distributor including an input terminal and a plurality of output terminals;
a plurality of phase shifters connected to separate, respective output terminals of the plurality of output terminals;
a plurality of antennas connected to separate, respective phase shifters of the plurality of phase shifters; and
an optical signal interferometer, the optical signal interferometer including
a plurality of first input waveguide regions connected to separate, respective antennas of the plurality of antennas and extending in a first direction,
a multi-mode waveguide region connected to the plurality of first input waveguide regions, and
an output waveguide region connected to the multi-mode waveguide region and extending in the first direction.

13. The beam steering OPA of claim 12, wherein,
the plurality of antennas include separate, respective output terminals of a plurality of remaining output terminals, and
the first input waveguide regions are connected to separate, respective output terminals of the plurality of remaining output terminals.

14. The beam steering OPA of claim 12, wherein adjacent first input waveguide regions among the plurality of first input waveguide regions are equidistantly separate from each other in a second direction perpendicular to the first direction.

15. The beam steering OPA of claim 12, wherein the output waveguide region is configured to correspond to a centerline of an entirety of the first input waveguide regions in the first direction.

16. A beam steering optical phased array (beam steering OPA), comprising:
an optical signal distributor, the optical signal distributor including a plurality of output terminals, the optical signal distributor configured to divide and output a plurality of optical signals through separate, respective output terminals of the plurality of output terminals;
a plurality of phase shifters coupled to separate, respective output terminals of the plurality of output terminals, the plurality of phase shifters configured to receive separate, respective optical signals of the plurality of optical signals and shift phases thereof to generate a plurality of phase-shifted optical signals; and
an optical signal interferometer, the optical signal interferometer including
a plurality of first input waveguide regions connected to separate, respective antennas of a plurality of antennas and extending in a first direction,
a multi-mode waveguide region connected to the plurality of first input waveguide regions, and
an output waveguide region connected to the multi-mode waveguide region and extending in the first direction.

17. The beam steering OPA of claim 16, wherein the phase shifters are configured to
change phases of the plurality of optical signals so that the plurality of phase-shifted optical signals have different phases from each other, and
correct phase errors of the plurality of phase-shifted optical signals.

18. The beam steering OPA of claim 16, wherein the plurality of phase shifters include
a plurality of first phase shifters configured to change phases of the plurality of optical signals to generate the plurality of phase-shifted optical signals that have different phases from each other, and
a plurality of second phase shifters configured to correct errors of the plurality of phase-shifted optical signals.

19. The beam steering OPA of claim 16, wherein
the plurality of antennas are configured to receive, from the plurality of phase shifters, the plurality of phase-shifted optical signals.

20. The beam steering OPA of claim 19, further comprising:
a plurality of optical signal branching elements configured to divide optical signals received from a portion of antennas, of the plurality of antennas, into a plurality of divided optical signals, the plurality of optical signal branching elements further configured to output the plurality of divided optical signals.

* * * * *